United States Patent
Hane et al.

(10) Patent No.: US 8,424,687 B2
(45) Date of Patent: Apr. 23, 2013

(54) SUPPORT FOR SEPARATION MEMBRANE, AND METHOD FOR PRODUCTION THEREOF

(75) Inventors: Ryoichi Hane, Shiga (JP); Jun Ogihara, Ehime (JP); Hiroyuki Matsuura, Shiga (JP); Yohei Nakano, Shiga (JP); Naoki Shibusawa, Shiga (JP); Tatsuya Kajino, Shiga (JP); Yoshikazu Yakake, Shiga (JP)

(73) Assignee: Toray Industries, Inc. (JP)

( * ) Notice: Subject to any disclaimer, the term of this patent is extended or adjusted under 35 U.S.C. 154(b) by 484 days.

(21) Appl. No.: 12/670,721

(22) PCT Filed: Jul. 28, 2008

(86) PCT No.: PCT/JP2008/063506
§ 371 (c)(1),
(2), (4) Date: Jan. 26, 2010

(87) PCT Pub. No.: WO2009/017086
PCT Pub. Date: Feb. 5, 2009

(65) Prior Publication Data
US 2010/0193428 A1 Aug. 5, 2010

(30) Foreign Application Priority Data

Jul. 31, 2007 (JP) ................... 2007-198581
Sep. 25, 2007 (JP) ................... 2007-246738
Oct. 30, 2007 (JP) ................... 2007-281308

(51) Int. Cl.
*B01D 69/10* (2006.01)
*B01D 67/00* (2006.01)
*D04H 13/00* (2006.01)
*B32B 5/26* (2006.01)

(52) U.S. Cl.
USPC ........... 210/489; 210/483; 210/488; 210/490; 210/491; 210/505; 210/507

(58) Field of Classification Search .......... 210/483, 210/488, 489, 490, 491, 505, 507; 442/327, 442/382, 392, 401
See application file for complete search history.

(56) References Cited

U.S. PATENT DOCUMENTS

| 4,728,394 A | 3/1988 | Shinjou et al. |
| 2005/0087070 A1 | 4/2005 | Odaka et al. |
| 2005/0130545 A1 | 6/2005 | Bansal et al. |

FOREIGN PATENT DOCUMENTS

| CN | 1602225 A | 3/2005 |
| EP | 1 044 719 A1 | 10/2000 |
| EP | 1 829 603 A1 | 9/2007 |
| EP | 1 980 308 A1 | 10/2008 |
| JP | 4-021526 B | 4/1992 |
| JP | 5-035009 B | 4/1992 |
| JP | 2000-176262 A | 6/2000 |
| JP | 1 142 702 A1 | 4/2001 |
| JP | 3153487 B2 | 4/2001 |
| JP | 2002-273181 A | 9/2002 |
| JP | 2003-306863 A | 10/2003 |
| JP | 2004-190161 A | 7/2004 |
| WO | 2006/068100 A1 | 6/2006 |
| WO | 2007/088824 A1 | 8/2007 |

*Primary Examiner* — John Kim
(74) *Attorney, Agent, or Firm* — DLA Piper LLP (US)

(57) ABSTRACT

A support for a separation membrane includes a long-fiber nonwoven fabric composed of thermoplastic continuous filaments.

10 Claims, No Drawings

SUPPORT FOR SEPARATION MEMBRANE, AND METHOD FOR PRODUCTION THEREOF

RELATED APPLICATIONS

This is a §371 of International Application No. PCT/JP2008/063506, with an international filing date of Jul. 28, 2008 (WO 2009/017086 A1, published Feb. 5, 2009), which is based on Japanese Patent Application Nos. 2007-198581, filed Jul. 31, 2007, 2007-246738, filed Sep. 25, 2007, and 2007-281308, filed Oct. 30, 2007, the subject matter of which is incorporated by reference.

TECHNICAL FIELD

This disclosure relates to a support for a separation membrane, which comprises a long-fiber nonwoven fabric composed of thermoplastic continuous filaments and is used for supporting a separation membrane such as a microfiltration membrane, an ultrafiltration membrane, a nanofiltration membrane and a reverse osmotic membrane, and a method for producing the same. Further, the disclosure relates to a separation membrane using the support for a separation membrane, and a fluid separation element.

BACKGROUND

In water treatment in recent years, membrane technology is applied to many cases. For example, water treatment in a water treatment plant, microfiltration membranes and ultrafiltration membranes are used, and reverse osmosis membranes are used for seawater desalination. Further, water for semiconductor production, boiler feed water, water for medical service and pure water for laboratory, reverse osmosis membranes and nanofiltration membranes are used. Furthermore, to sewage water/waste water treatment, a membrane-separation activated sludge method using microfiltration membranes and ultrafiltration membranes is applied.

These separation membranes are broadly divided into a plain membrane and a hollow-fiber membrane. Among these membrane, the plain membrane mainly formed from synthesized polymers is often used generally in combination with a support such as a nonwoven fabric or a web since it is inferior in mechanical strength by a membrane having a separation function alone.

Generally, a membrane having a separation function and a support are unified by a method of fixing the membrane and the support to each other by applying a polymer solution, which is a raw material of the membrane having a separation function, onto the support such as a nonwoven fabric, a fabric or the like and spreading the polymer solution. Further, in a semi-permeable membrane such as a reverse osmosis membrane or the like, the membrane and the support are unified by a method in which a supporting layer is formed by applying a polymer solution onto the support such as a nonwoven fabric, a fabric or the like and spreading the polymer solution, and then a semipermeable membrane is formed on the supporting layer.

Therefore, the nonwoven fabric, the fabric and the like to become a support require such an excellent film-forming property that when applying and spreading a polymer solution, the polymer solution does not cause strike through due to excessive permeation, membrane substances do not peel and defects such as nonuniform membranes and pinholes due to fuzz of the support are not produced.

Further, in the case of a semipermeable membrane such as a reverse osmosis membrane often used under a high pressure, particularly, the support requires high mechanical strength and high dimensional stability.

Hitherto, as such a support for a separation membrane, a support for a separation membrane comprising a nonwoven fabric having a multilayered structure, in which a two-layered structure including a surface layer having large opening and surface roughness using thick fibers and a backside layer having small opening and a compact structure using thin fibers is basic, is proposed (Japanese Examined Patent Publication No. 4-21526). Further, in a support for a semipermeable membrane comprising a nonwoven fabric for applying and spreading a polymer solution for forming a semipermeable membrane to form a membrane, a support for a semipermeable membrane, in which the nonwoven fabric is a nonwoven fabric having a two-layered structure formed by laminating and unifying a low-density layer where air permeability is 5 to 50 $cc/cm^2/sec$ and a high-density layer where air permeability is 0.1 $cc/cm^2/sec$ or more and less than 5 $cc/cm^2/sec$, and overall air permeability is 0.1 $cc/cm^2/sec$ to 4.5 $cc/cm^2/sec$, is proposed (Japanese Examined Patent Publication No. 5-35009).

However, since these supports for membrane comprise composed of short fibers instead of a continuous fiber, a nonuniform membranes and defects may be produced due to fuzz. Furthermore, in these documents, there is no proposal about strength of the nonwoven fabric, and since there is not detail description about strength, there is a problem that adequate mechanical strength and dimensional stability cannot be achieved as a support for a membrane.

Further, aside from these supports for a separation membrane, as such a support for a separation membrane, a support for a semipermeable membrane comprising a nonwoven fabric in which an average of a breaking length of elongation of 5% in a machine direction (MD) and a breaking length of elongation of 5% in a crosswise direction (CD) is 4.0 km or more and air permeability is 0.2 to 10.0 $cc/cm^2 \cdot sec$ is proposed (Japanese Patent Publication No. 3153487). However, this support for a semipermeable membrane is not composed of continuous filaments, but comprises a nonwoven fabric composed of short fibers produced by a papermaking method. Therefore, to obtain a semipermeable membrane having required high mechanical strength, this requires many complicated steps, for example, yarn is stretched in warm water bath after melt spinning, and subsequently double refraction of fiber composing a nonwoven fabric is significantly increased by stretched heat treatment and/or relaxed heat treatment, and heat shrinkage stress is set at a specified range. Accordingly, the support for a semipermeable membrane of this proposal has problems that the support becomes expensive, and since it comprises a nonwoven fabric composed of short fibers, a nonuniform membranes and defects may be produced due to fuzz.

Therefore, it could be helpful to provide a support for a separation membrane, which comprises a long-fiber nonwoven fabric composed of thermoplastic continuous filaments and exhibits an excellent film-forming property and excellent mechanical strength when used for supporting a separation membrane such as a microfiltration membrane, an ultrafiltration membrane, a nanofiltration membrane and a reverse osmotic membrane, and a method for producing the same.

It could also be helpful to provide a separation membrane and a fluid separation element each utilizing the support for a separation membrane.

SUMMARY

We provide a support for a separation membrane comprising a long-fiber nonwoven fabric composed of thermoplastic continuous filaments.

In accordance with a preferable aspect of the support for a separation membrane, the long-fiber nonwoven fabric is a laminated long-fiber nonwoven fabric formed by laminating 2 to 5 sheets of nonwoven fabrics made of long fibers.

In accordance with a preferable aspect of the support for a separation membrane, at least one layer in the laminated long-fiber nonwoven fabric is a spunbonded nonwoven fabric.

In accordance with a preferable aspect of the support for a separation membrane, the long-fiber nonwoven fabric substantially comprises only spunbonded nonwoven fabric(s).

In accordance with a preferable aspect of the support for a separation membrane, tensile strength in a crosswise direction of the long-fiber nonwoven fabric is 50 N/5 cm or more and a ratio of tensile strength in a machine direction to tensile strength in a crosswise direction is 2.7 or less.

In accordance with a preferable aspect of the support for a separation membrane, tensile strength of the long-fiber nonwoven fabric is 80 to 900 N/5 cm, tensile elongation of the long-fiber nonwoven fabric is 15 to 50%, and a product of tensile strength and tensile elongation calculated by the following equation:

Product of tensile strength and tensile elongation[$N/5$ cm]=tensile strength[$N/5$ cm]×(1+tensile elongation[%]/100), is 120 to 1300 N/5 cm.

In accordance with a preferable aspect of the support for a separation membrane, both stresses of elongation of 5% in a machine direction and a crosswise direction of the long-fiber nonwoven fabric are 50 N/5 cm or more.

In accordance with a preferable aspect of the support for a separation membrane, a ratio of stress of elongation of 5% in a machine direction to stress of elongation of 5% in a crosswise direction of the long-fiber nonwoven fabric is 2.7 or less.

In accordance with a preferable aspect of the support for a separation membrane, the thermoplastic continuous filament is a complex-type filament made of polymers having different melting points, in which a low melting point polymer having a melting point lower by 10 to 140° C. than that of a high melting point polymer is arranged about the high melting point polymer.

In accordance with a preferable aspect of the support for a separation membrane, a coefficient of variance of luminance of transmitted light of the long-fiber nonwoven fabric is 1.0 to 6.0%.

In accordance with a preferable aspect of the support for a separation membrane, a packed density of the long-fiber nonwoven fabric is 0.4 to 0.8, an air permeability is 0.2 to 30.0 cc/cm²/sec, and a change rate between a thickness at a low load (an indenter of 16 mm in diameter, load 2 kPa) and a thickness at a high load (an indenter of 16 mm in diameter, load 200 kPa) is 0.00 to 0.03 mm.

In accordance with a preferable aspect of the support for a separation membrane, average surface roughness of the long-fiber nonwoven fabric is 2 to 9 μm.

A separation membrane can be obtained by forming a membrane having a separation function on the surface of the support for a separation membrane. Further, a fluid separation element including the separation membrane as a constituent can be obtained.

Further, we provide a method for producing a support for a separation membrane comprising the step of thermocompression bonding long-fiber nonwoven fabrics composed of thermoplastic continuous filaments or a laminated body thereof between a pair of upper/lower flat rolls, at least one of which is maintained at a temperature lower by 80 to 20° C. than a melting point of a polymer composing at least the surface of the thermoplastic continuous filament, to unify them.

Further, in accordance with a preferable aspect of the method for producing a support for a separation membrane, a temperature difference is made between flat rolls by setting a temperature of flat roll on a high-temperature side at a temperature lower by 80 to 20° C. than a melting point of a polymer composing the surface of the thermoplastic continuous filament and setting a temperature of flat roll on a low-temperature side at a temperature lower by 40 to 120° C. than a temperature of the flat roll on a high-temperature side, and thermocompression bonding is performed.

Further, the method for producing a support for a separation membrane is a method in which long-fiber nonwoven fabrics composed of thermoplastic continuous filaments are preliminarily thermocompression bonded between a pair of upper/lower flat rolls, or between one flat roll and a collecting conveyor used for collecting fibrous web at a temperature lower by 120 to 20° C. than a melting point of a polymer composing at least the surface of the thermoplastic continuous filament, and plural sheets of the nonwoven fabric preliminarily thermocompression bonded are superimposed on one another, and the resulting laminated body is thermocompression bonded between a pair of upper/lower flat rolls, at least one of which is maintained at a temperature lower by 80 to 20° C. than a melting point of a polymer composing at least the surface of the thermoplastic continuous filament, and unified.

In accordance with a preferable aspect of the above-mentioned method for producing a support for a separation membrane, the above-mentioned pair of flat rolls are metallic for both an upper roll and a lower roll.

In accordance with a preferable aspect of the above-mentioned method for producing a support for a separation membrane, one of the above-mentioned pair of flat rolls is a metal roll and the other is an elastic roll.

We obtain a support for a separation membrane, which comprises a long-fiber nonwoven fabric composed of thermoplastic continuous filaments and exhibits an excellent film-forming property and excellent mechanical strength when used for supporting a separation membrane such as a microfiltration membrane, an ultrafiltration membrane, a nanofiltration membrane and a reverse osmotic membrane.

Further, we obtain a support for a separation membrane comprising a long-fiber nonwoven fabric which is composed of thermoplastic continuous filaments and is superior in uniformity of weight per unit area in a minute area.

Further, we obtain a support for a separation membrane in which the depression into an indentation of a material of a permeated liquid flow passage is less even when a high reverse osmotic pressure is applied and permeated liquid can stably passes through and therefore high water re-use capacity can be secured since a long-fiber nonwoven fabric, which is composed of thermoplastic continuous filaments and has a small difference between strength in a machine direction and strength in a crosswise direction, is used.

Furthermore, we obtain a support for a separation membrane which can suppress distortion due to bending in a lateral direction or tension of a process step when forming a membrane to form a membrane uniformly.

DETAILED DESCRIPTION

A support for a separation membrane is a support for a separation membrane for forming a membrane having a separation function on the surface thereof.

It is important that a support for a separation membrane comprises a long-fiber nonwoven fabric composed of thermoplastic continuous filaments. We investigated the causes of nonuniformity of a polymer solution in applying and spreading the polymer solution and membrane defects, which often occur in the case of using a nonwoven fabric composed of short fibers, and found that the fuzz of fibers composing the nonwoven fabric composed of short fibers contribute to these problems. Further, we found that these problems can be solved by using a nonwoven fabric composed of long fibers. That is, by using a long-fiber nonwoven fabric composed of thermoplastic continuous filaments, it is possible to suppress nonuniformity of a polymer solution in applying and spreading the polymer solution and membrane defects, which are produced due to the fuzz of fibers occurring in the case of using a nonwoven fabric composed of short fibers.

Moreover, since the support for a separation membrane is a long-fiber nonwoven fabric composed of thermoplastic continuous filaments, it has higher mechanical strength than a nonwoven fabric composed of short fibers, especially a paper nonwoven fabric in which a fiber length is short. Accordingly, the support for a separation membrane exhibits excellent durability as a support for a semipermeable membrane to which high pressure is particularly applied during use among the supports for a separation membrane.

A nonwoven fabric composing the support for a separation membrane is a long-fiber nonwoven fabric composed of thermoplastic continuous filaments such as a spunbonded nonwoven fabric produced by a spunbonding method, melt blowing nonwoven fabric produced by a melt blowing method or the like. The long-fiber nonwoven fabric is preferably a spunbonded nonwoven fabric because when forming a separation membrane on the spunbonded nonwoven fabric, a separation membrane having a good film-forming property and excellent durability can be obtained and the obtained separation membrane is more superior in mechanical strength and dimensional stability.

Further, the long-fiber nonwoven fabric composing the support for a separation membrane may be a monolayer, but a laminated body (referred to as a laminated long-fiber nonwoven fabric) consisting of a plurality of long-fiber nonwoven fabrics is also a preferable form since by the laminated body, a more uniform support for a separation membrane can be obtained as described later. The laminated long-fiber nonwoven fabric preferably comprises a laminated body in which at least one layer in the laminated body is a spunbonded nonwoven fabric, for example, a three-layered laminated body in which a sheet of melt blowing nonwoven fabric is disposed between layers of a two-layered spunbonded nonwoven fabric. Further, an aspect, in which the laminated long-fiber nonwoven fabric substantially comprises only spunbonded nonwoven fabric(s) like a laminated body composed of a two-layered spunbonded non-woven fabric, is preferable.

The thermoplastic continuous filaments composing the long-fiber nonwoven fabric may be thermoplastic continuous filaments made of a single component, or may be complex-type thermoplastic continuous filaments made of a plurality of components. In the support for a separation membrane, a preferable aspect is that the support for a separation membrane comprises a long-fiber nonwoven fabric composed of the complex-type thermoplastic continuous filaments (referred to as complex-type filaments) in which two or more polymers having different melting points are used and a low melting point polymer having a melting point lower by 10 to 140° C. than that of a high melting point polymer is arranged about the high melting point polymer.

By arranging the low melting point polymer having a melting point lower by 10 to 140° C. than that of a high melting point polymer about the high melting point polymer, complex-type filaments composing the long-fiber nonwoven fabric are firmly bonded to one another when a long-fiber nonwoven fabric is formed by thermocompression bonding and the formed long-fiber nonwoven fabric is used as a support for a separation membrane. Accordingly, it is possible to suppress nonuniformity of a polymer solution in applying and spreading the polymer solution and membrane defects due to the fuzz of fibers. Further, by using such a complex-type filament, number of bonded points increases compared with a mixed type nonwoven fabric in which plural species of fibers having different melting points are mixed in addition to the fact that complex-type filaments composing the long-fiber nonwoven fabric are firmly bonded to one another. Therefore, use of the complex-type filament leads to improvements in dimensional stability and durability in using as a support for a semipermeable membrane to which among others, a high pressure is applied in use.

In a complex-type filament, if a difference in melting point between the high melting point polymer and the low melting point polymer is 10° C. or more, desired thermobonding can be achieved. Further, when the melting point difference is 140° C. or less, it is possible to prevent a low melting point polymer component from fusing with a thermocompression bonding roll during thermocompression bonding, leading to the reduction of productivity. The melting point difference between the high melting point polymer and the low melting point polymer is more preferably in a range of 20 to 120° C., and furthermore preferably in a range of 30 to 100° C.

Further, a melting point of the high melting point polymer in the case where the support for a separation membrane comprises the long-fiber nonwoven fabric composed of the complex-type filaments is preferably in a range of 160 to 320° C. because when forming a separation membrane on the support for a separation membrane, a separation membrane having a good film-forming property and excellent durability can be obtained. When the melting point of the high melting point polymer is 160° C. or higher, in the case where the long-fiber nonwoven fabric is formed and used as a support for a separation membrane, form stability is high even when the nonwoven fabric undergoes a process to which heat is added during producing separation membranes or fluid separation elements. Further, when a melting point of the high melting point polymer is 320° C. or less, it is possible to prevent heat energy used for melting during producing long-fiber nonwoven fabrics from being consumed largely, leading to the reduction of productivity. The melting point of the high melting point polymer is preferably in a range of 170 to 300° C., and more preferably in a range of 180 to 280° C.

A percentage which the low melting point polymer makes up in the complex-type filament is preferably 10 to 70% by weight from the viewpoint of obtaining a long-fiber nonwoven fabric suitable for a support for a separation membrane. The percentage of the low melting point polymer is more preferably 15 to 60% by weight, and furthermore preferably 20 to 50% by weight. When the percentage of the low melting point polymer is 10% by weight or more, desired thermobonding can be achieved. Further, when the percentage is 70% by weight or less, it is possible to prevent a low melting point polymer component from fusing with a thermocompression bonding roll during thermocompression bonding, leading to the reduction of productivity.

Examples of complex forms of the complex-type filaments include forms such as a concentric core-sheath type, an eccentric core-sheath type and a sea-island type from the viewpoint of obtaining a long-fiber nonwoven fabric suitable for a support for a separation membrane. Furthermore, examples of the shape of a cross section of the complex-type filament include a circular cross section, a planiform cross section, a polygonal cross section, a multifoil cross section, and a hollow cross section. Among these forms, a concentric filament of a core-sheath type is preferably used as a complex form and a circular cross section or a planiform cross section is preferably used as a shape of a cross section of the filament because these filaments can be firmly bonded to one another by thermocompression bonding and a thickness of the resulting support for a separation membrane can be reduced to increase an area of the separation membrane per a unit of a fluid separation element.

It is a preferable form of the long-fiber nonwoven fabric composing the support for a separation membrane that it is a laminated long-fiber nonwoven fabric consisting of a plurality of long-fiber nonwoven fabric layers as described above. By forming a laminated body like this, it is possible to obtain a more uniform support for a separation membrane, and by forming an interface between laminated layers, it is possible to prevent strike through due to excessive permeation in applying and spreading a polymer solution and obtain an excellent film-forming property. Number of laminated layers of the laminated long-fiber nonwoven fabric is preferably 2 to 5. When the number of laminated layers is two or more, a texture of the nonwoven fabric is improved and adequate uniformity is attained compared with the case of monolayer. When the number of laminated layers is five or less, wrinkles produced during lamination can be suppressed and delamination can be inhibited.

Examples of methods of unifying the laminated long-fiber nonwoven fabric include compression bonding by heat, compression bonding using an adhesive, and mechanical entanglement and further combinations thereof. Among these methods, compression bonding by heat using a pair of flat rolls is a preferable means because a thickness of the resulting support for a separation membrane can be reduced to increase an area of the separation membrane per a unit of a fluid separation element. Further, a combination of compression bonding by heat and compression bonding using an adhesive is also preferably employed. Examples of the adhesive include powders, fibers, and nonwoven fabrics, which are made of a resin having a melting point lower than a melting point of the long-fiber nonwoven fabric to be laminated.

The support for a separation membrane preferably has high rigidity and high toughness capable of standing a high pressure particularly in the case of being used as a support for separation membranes such as a reverse osmosis membrane and the like. Herein, preferable rigidity refers to rigidity for avoiding distortions due to a high reverse osmotic pressure. Further, the toughness is toughness for avoiding breakage due to momentarily applied forces such as pressure fluctuation. We noted a balance between the tensile strength and the tensile elongation of the long-fiber nonwoven fabric composing the support for a separation membrane to achieve both characteristics of rigidity and toughness. We found that both rigidity and toughness of a support for a separation membrane are improved by enhancing both of the tensile strength and the tensile elongation of the support for a separation membrane, that is, enhancing a product of the tensile strength and the tensile elongation, since the rigidity and the toughness suitable as the support for a separation membrane are not improved even when only one of the tensile strength and the tensile elongation is enhanced. Herein, the product of tensile strength and tensile elongation is a value calculated by the following equation:

$$\text{Product of tensile strength and tensile elongation}[N/5\ cm] = \text{tensile strength}[N/5\ cm] \times (1 + \text{tensile elongation}[\%]/100).$$

Next, the tensile strength, the tensile elongation and the product of tensile strength and tensile elongation will be described in detail.

The tensile strength of the long-fiber nonwoven fabric composing the support for a separation membrane is preferably 80 to 900 N/5 cm. The tensile strength is more preferably 90 to 850 N/5 cm, and furthermore preferably 100 to 700 N/5 cm.

Further, the tensile elongation of the long-fiber nonwoven fabric is preferably 15 to 50%. The tensile elongation is more preferably 18 to 45%, and furthermore preferably 20 to 40%.

Furthermore, the product of tensile strength and tensile elongation of the long-fiber nonwoven fabric is preferably 120 to 1300 N/5 cm, more preferably 170 to 1100 N/5 cm, and furthermore preferably 220 to 900 N/5 cm.

When the tensile strength and the tensile elongation of the support for a separation membrane along a direction perpendicular to a direction of a groove made of a material of a permeated liquid flow passage are high, rigidity for the stress on the separation membrane, which is generated through the depression of the separation membrane in the material of a permeated liquid flow passage at the time of applying a pressure vertically to the separation membrane, is improved. However, if the tensile strength is too high, a feeling of the separation membrane becomes hard, and toughness against a pressure in a vertical direction is deteriorated. On the contrary, if the tensile elongation is too large, a problem that the depression rate of the support for a separation membrane in the material of a permeated liquid flow passage increases and a residual strain remains arises. Therefore, if considering a balance between the tensile strength and the tensile elongation, it is preferable that as described above, the tensile strength is 80 to 900 N/5 cm, the tensile elongation is 15 to 50%, and the product of tensile strength and tensile elongation is 120 to 1300 N/5 cm. By having a balance between the tensile strength and the tensile elongation like this, distortions and damages due to a pressure applied in using the long-fiber nonwoven fabric as a support for a separation membrane are less and the depression rate of the separation membrane in the material of a permeated liquid flow passage becomes small, and therefore membrane performance or a processing capacity is easily retained.

The tensile strength and the tensile elongation of the long-fiber nonwoven fabric can be measured by a method described in paragraph (3) in Examples described later.

To obtain the long-fiber nonwoven fabric composing the support for a separation membrane in which the tensile strength is 80 to 900 N/5 cm, the tensile elongation is 15 to 50%, and the product of tensile strength and tensile elongation is 120 to 1300 N/5 cm, the following means are preferably employed:

(a) A long-fiber nonwoven fabric substantially comprising only spunbonded nonwoven fabric(s) is used.

(b) When the long-fiber nonwoven fabric is a laminated body consisting of a plurality of nonwoven fabric layers, a spunbonded nonwoven fabric is used for at least one layer in the laminated body.

(c) As the thermoplastic continuous filaments composing the long-fiber nonwoven fabric, a complex-type filament, in which a low melting point polymer having a melting point lower by 10 to 140° C. than that ea high melting point polymer is arranged about the high melting point polymer, is used.

(d) A spunbonded nonwoven fabric produced at a spinning speed of 4000 m/min or more is used.

(e) A laminated long-fiber nonwoven fabric fabricated by a method, in which long-fiber nonwoven fabrics composed of thermoplastic continuous filaments or a laminated body thereof are preliminarily thermocompression bonded between a pair of upper/lower flat rolls, at least one of which is maintained at a temperature lower by 120 to 20° C. than a melting point of a polymer composing at least the surface of the thermoplastic continuous filament, or between one flat roll and a collecting conveyor used for collecting fibrous web, and in a continuous step or after the nonwoven fabric in a state of temporary bonding, in which a high-density layer is formed on a surface side and/or a backside, is taken up, plural sheets of the nonwoven fabric in a state of temporary bonding, preliminarily thermocompression bonded, are superimposed on one another, and the resulting laminated body is thermocompression bonded with a pair of upper/lower flat rolls, at least one of which is maintained at a temperature lower by 80 to 20° C. than a melting point of a polymer composing at least the surface of the thermoplastic continuous filament, and unified, is employed.

As raw materials of the thermoplastic continuous filaments composing the long-fiber nonwoven fabric, polymers, which can provide a long-fiber nonwoven fabric suitable for the support for a separation membrane, are used. Examples of such raw materials include polyester polymers, polyamide polymers, polyolefin polymers, and mixtures or copolymers thereof. The raw materials are preferably polyester polymers since a support for a separation membrane, which is more excellent in durability such as mechanical strength, heat resistance, water resistance, chemical resistance and the like, can be obtained from the polyester polymers.

The polyester polymers are polyesters comprising an acid component and an alcohol component. As acid components, aromatic carboxylic acids such as terephthalic acid, isophthalic acid and phthalic acid; aliphatic dicarboxylic acids such as adipic acid and sebacic acid; and alicyclic dicarboxylic acids such as cyclohexanecarboxylic acid can be used. Further, as alcohol components, ethylene glycol, diethylene glycol and polyethylene glycol can be used.

Examples of the polyester polymers include a polyethylene terephthalate resin, a polybutylene terephthalate resin, a polytrimethylene terephthalate resin, a polyethylene naphthalate resin, a poly(lactic acid) resin and a poly(butylene succinate) resin, and include copolymers of these resins.

Further, as described above, the complex-type filament made of polymers having different melting points, in which a low melting point polymer having a melting point lower by 10 to 140° C. than that of a high melting point polymer is arranged about the high melting point polymer, can be used. Examples of a combination (high melting point polymer/low melting point polymer) of the high melting point polymer and the low melting point polymer in the case of forming such the complex-type filament include polyethylene terephthalate resin/polybutylene terephthalate resin, polyethylene terephthalate resin/polytrimethylene terephthalate resin, polyethylene terephthalate resin/poly(lactic acid) resin, and polyethylene terephthalate resin/copolymerization polyethylene terephthalate resin. Further, as a copolymerization component of a copolymerization polyethylene terephthalate resin, isophthalic acid and the like are preferably used.

Furthermore, biodegradable resins are preferably used as a raw material of the thermoplastic continuous filament since disposal is easy and an environmental burden is small in discarding used supports for a separation membrane. Examples of the biodegradable resins include a poly(lactic acid) resin, a poly(butylene succinate) resin, a polycaprolactone resin, a poly(ethylene succinate) resin, a poly(glycolic acid) resin, and a poly(hydroxy butylate) resin. Among these resins, the poly(lactic acid) resin derived from a lactic acid obtained by fermentation of, which is a plant-derived resin not depleting petroleum resources and attracts lots of attention in recent years as a biodegradable resin of low production cost, having relatively high mechanical characteristics and heat resistance, is preferably used as a raw material of fibers composing a long-fiber nonwoven fabric. Examples of the poly(lactic acid) resins preferably include poly(D-lactic acid), poly(L-lactic acid), copolymers of D-lactic acid and L-lactic acid, and blended substances thereof.

A crystal nucleus agent, a flatting agent, a lubricant, a pigment, a fungicide, an anti-fungus agent, a retarder, and a hydrophilization agent may be mixed in or added to the long-fiber nonwoven fabric composing the support for a separation membrane to the extent of not impairing an effect of this disclosure. Particularly, metal oxides such as titanium oxide and the like has an effect of improving a bonding property of the long-fiber nonwoven fabric through enhancing thermal conductivity in molding the long-fiber nonwoven fabric by thermocompression bonding. Further, aliphatic bisamides such as ethylenebis(stearamide) and the like and/or alkyl-substituted aliphatic monoamides has an effect of improving bonding stability through enhancing a releasing property of a long-fiber nonwoven fabric from a thermocompression bonding roll. These various additives may be contained within the thermoplastic continuous filament or may be present on the surface thereof.

The support for a separation membrane preferably comprises the long-fiber non-woven fabric in which a coefficient of variance of luminance of transmitted light is 1.0 to 6.0%. The coefficient of variance of luminance of transmitted light of the long-fiber nonwoven fabric is more preferably 1.0 to 5.0%, and furthermore preferably 1.0 to 4.0%. If the coefficient of variance of luminance of transmitted light of the long-fiber nonwoven fabric is 1.0% or more, when forming a separation membrane on the support for a separation membrane, peeling of a membrane due to insufficient permeation in applying and spreading a polymer solution is less and a good film-forming property can be attained. On the other hand, if the coefficient of variance of luminance of transmitted light of the long-fiber nonwoven fabric is 6.0% or less, when using the long-fiber nonwoven fabric as a support for a separation membrane, the weight per unit area of a minute area is uniform. Therefore, excessive permeation in applying and spreading a polymer solution is suppressed and thereby strike through becomes less, and therefore the long-fiber nonwoven fabric can be suitably used as a support for a separation membrane.

The coefficient of variance of luminance of transmitted light of the long-fiber nonwoven fabric refers to a coefficient of variance determined from a standard deviation of luminance in quantifying an amount of fiber in a minute area in terms of the luminance of transmitted light in the minute area, and the coefficient of variance refers to a value measured by a method described in paragraph (5) in Examples described later.

To obtain the long-fiber nonwoven fabric composing the support for a separation membrane in which the coefficient of variance of luminance of transmitted light is 1.0 to 6.0%, it is preferable to make a laminated nonwoven fabric formed by laminating/unifying as a long-fiber nonwoven fabric. Number of laminated layers of the long-fiber nonwoven fabric is preferably 2 to 5. When the number of laminated layers is two or more, a texture of the nonwoven fabric is improved and adequate uniformity is attained compared with the case of monolayer. When the number of laminated layers is five or less, wrinkles produced during lamination can be suppressed and delamination can be inhibited.

Further, to obtain the long-fiber nonwoven fabric composing the support for a separation membrane in which the coefficient of variance of luminance of transmitted light is 1.0 to 6.0%, it is also preferable to set an average fiber diameter of thermoplastic continuous filaments composing the long-fiber nonwoven fabric at 3 to 17 μm. When an average fiber diameter of thermoplastic continuous filaments is 3 μm or more, since a spinning property is hardly deteriorated during producing the long-fiber nonwoven fabric and air permeability of the support for a separation membrane can be maintained, peeling of a membrane in applying and spreading a polymer solution is less and a good film-forming property can be attained. On the other hand, when an average fiber diameter of thermoplastic continuous filaments is 17 μm or less, since the long-fiber nonwoven fabric and the support for a separation membrane, which are superior in uniformity, can be attained and the support for a separation membrane can be more dense, excessive permeation in applying and spreading a polymer solution is less and an excellent film-forming property can be attained.

In the long-fiber nonwoven fabric composing the support for a separation membrane, it is preferable that tensile strength in a crosswise direction is 50 to 900 N/5 cm and a ratio of tensile strength in a machine direction to tensile strength in a crosswise direction is 1.0 to 2.7. Further, an aspect, in which tensile strength in a crosswise direction is 70 to 900 N/5 cm and a ratio of tensile strength in a machine direction to tensile strength in a crosswise direction is 1.0 to 2.5, is more preferable, and an aspect, in which tensile strength in a crosswise direction is 90 to 900 N/5 cm and a ratio of tensile strength in a machine direction to tensile strength in a crosswise direction is 1.0 to 2.3, is furthermore preferable.

In the long-fiber nonwoven fabric, generally, the tensile strength in a travelling direction or machine direction during producing nonwoven fabrics has a tendency to become larger than the tensile strength that in a crosswise direction. On the other hand, since the separation membrane such as a reverse osmosis membrane is often used in a state of being superimposed on another in such a way that a direction of a groove of the material of a permeated liquid flow passage is orthogonal to a crosswise direction of the support for a separation membrane, if the tensile strength in a crosswise direction of the long-fiber nonwoven fabric composing the support for a separation membrane is 50 N/5 cm or more and a ratio of tensile strength in a machine direction to tensile strength in a crosswise direction is 2.7 or less, the separation membrane stands a force whichever direction the force is applied to, and it is possible to suppress the depression of the separation membrane into a groove even when a particularly high reverse osmotic pressure is applied to the separation membrane. On the other hand, if the tensile strength in a crosswise direction is 900 N/cm or less, it is possible to inhibit a change of a feeling to a hard feeling due to a too high tensile strength, and if the ratio of tensile strength in a machine direction to tensile strength in a crosswise direction is 1.0 or more, it is possible to prevent the productivity of the long-fiber nonwoven fabric from significantly deteriorating.

The tensile strength in a crosswise direction and the ratio of tensile strength in a machine direction to tensile strength in a crosswise direction of the long-fiber nonwoven fabric refer to values measured by a method described in paragraph (3) in Examples described later.

To obtain the long-fiber nonwoven fabric composing the support for a separation membrane in which tensile strength in a crosswise direction is 50 to 900 N/5 cm and a ratio of tensile strength in a machine direction to tensile strength in a crosswise direction is 1.0 to 2.7, it is preferable to use the long-fiber nonwoven fabric substantially comprising only spunbonded nonwoven fabric(s) or to use a spunbonded nonwoven fabric for at least one layer in a laminated body when the long-fiber nonwoven fabric is the laminated body consisting of a plurality of non-woven fabric layers. Further, an aspect of using a complex-type filament, in which a low melting point polymer having a melting point lower by 10 to 140° C. than that of a high melting point polymer is arranged about the high melting point polymer, as a thermoplastic continuous filament composing the long-fiber nonwoven fabric is preferable for obtaining the long-fiber non-woven fabric in which tensile strength in a crosswise direction is 50 to 900 N/5 cm and a ratio of tensile strength in a machine direction to tensile strength in a crosswise direction is 1.0 to 2.7.

A packed density of the long-fiber nonwoven fabric composing the support for a separation membrane is preferably 0.4 to 0.8. The packed density is more preferably 0.5 to 0.8, and furthermore preferably 0.6 to 0.8. When the packed density is 0.4 or more, since voids within the long-fiber nonwoven fabric are few, the long-fiber nonwoven fabric is less prone to being distorted and damaged by an external pressure when using it as a support for a separation membrane. On the other hand, when the packed density is 0.8 or less, since water permeability or air permeability of the long-fiber nonwoven fabric can be secured, pressure loss of a support for a separation membrane does not become too high.

The packed density of the long-fiber nonwoven fabric refers to a value measured by a method described in paragraph (8) in Examples described later.

To obtain the long-fiber nonwoven fabric composing the support for a separation membrane and having a packed density of 0.4 to 0.8, it is preferable to use a complex-type filament, in which a low melting point polymer having a melting point lower by 10 to 140° C. than that of a high melting point polymer is arranged about the high melting point polymer, as a thermoplastic continuous filament composing the long-fiber nonwoven fabric. Further, an aspect, in which an average fiber diameter of thermoplastic continuous filaments composing the long-fiber nonwoven fabric is set at 3 to 17 μm and a long-fiber nonwoven fabric obtained by a spunbonding method is unified in the form of a sheet by thermocompression bonding, is preferable for obtaining the long-fiber nonwoven fabric having a packed density of 0.4 to 0.8.

An air permeability of the long-fiber nonwoven fabric composing the support for a separation membrane is preferably 0.2 to 30.0 cc/cm$^2$/sec. The air permeability is more preferably 0.3 to 20.0 cc/cm$^2$/sec, and furthermore preferably 0.4 to 10.0 cc/cm$^2$/sec. When the air permeability is 0.2 cc/cm$^2$/sec or more, pressure loss of a support for a separation membrane does not become too high. On the other hand, when the air permeability is 30.0 cc/cm$^2$/sec or less, compactness of the long-fiber nonwoven fabric can be maintained to facilitate formation of the long-fiber nonwoven fabric.

The air permeability of the long-fiber nonwoven fabric refers to a value measured by a method described in paragraph (9) in Examples described later.

To obtain the long-fiber nonwoven fabric composing the support for a separation membrane in which the air permeability is 0.2 to 30.0 cc/cm$^2$/sec, an average fiber diameter of thermoplastic continuous filaments composing the long-fiber nonwoven fabric is preferably set at 3 to 17 μm. Further, an aspect, in which weight per unit area of the long-fiber nonwoven fabric is 20 to 150 g/m$^2$ and a long-fiber nonwoven fabric obtained by a spunbonding method is unified in the form of a sheet by thermocompression bonding, is preferable for obtaining the long-fiber nonwoven fabric having an air permeability of 0.2 to 30.0 cc/cm$^2$/sec.

In the long-fiber nonwoven fabric composing the support for a separation membrane, a change rate between a thickness at a low load and a thickness at a high load is preferably 0.00 to 0.03 mm. The change rate in thicknesses is more preferably 0.00 to 0.02 mm, and furthermore preferably 0.00 to 0.01 mm. Herein, the change rate between a thickness at a low load and a thickness at a high load refers to a difference between a thickness at the time of applying a low load (load 2 kPa) with an indenter of 16 mm in diameter and a thickness at the time of applying a high load (load 200 kPa) with the same indenter. Particularly, a support of a separation membrane such as a reverse osmosis membrane is subjected to a high reverse osmotic pressure, and therefore it preferably has high rigidity capable of standing a high pressure. Herein, preferable rigidity refers to rigidity for standing a force applied vertically to the separation membrane and avoiding distortion due to the force. When the change rate between a thickness at a low load and a thickness at a high load of the long-fiber nonwoven fabric is small, the rigidity can be said to be a desired rigidity and the long-fiber nonwoven fabric is suitable for the support for a separation membrane.

When the change rate between a thickness at a low load and a thickness at a high load of the long-fiber nonwoven fabric is 0.03 mm or less, distortions due to a pressure applied, particularly a pressure partially applied, in using the long-fiber nonwoven fabric as a support for a separation membrane are less, and therefore membrane performance or a processing capacity can be retained.

The change rate between a thickness at a low load and a thickness at a high load of the long-fiber nonwoven fabric refers to a value measured by a method described in paragraph (10) in Examples described later.

To obtain the long-fiber nonwoven fabric composing the support for a separation membrane in which a change rate between a thickness at a low load and a thickness at a high load of the long-fiber nonwoven fabric is 0.00 to 0.03 mm, it is preferable to use a complex-type filament, in which a low melting point polymer having a melting point lower by 10 to 140° C. than that of a high melting point polymer is arranged about the high melting point polymer, as a thermoplastic continuous filament composing the long-fiber nonwoven fabric. Further, an aspect, in which an average fiber diameter of thermoplastic continuous filaments composing the long-fiber nonwoven fabric is set at 3 to 17 μm and a long-fiber nonwoven fabric obtained by a spunbonding method is unified in the form of a sheet by thermocompression bonding, is preferable for obtaining the long-fiber nonwoven fabric in which a change rate between a thickness at a low load and a thickness at a high load is 0.00 to 0.03 mm.

Average surface roughness of the long-fiber nonwoven fabric composing the support for a separation membrane is preferably 2 to 9 μm. The average surface roughness is more preferably 2 to 8 μm, and furthermore preferably 2 to 7 μm. When the average surface roughness of the long-fiber nonwoven fabric is 2 μm or more, it is rare that the surface of the nonwoven fabric is extremely packed, and this causes an increase of pressure loss or peeling of the separation membrane on the support when using the nonwoven fabric as a support for a separation membrane. Further, when the average surface roughness of the long-fiber nonwoven fabric is 9 μm or less, it is rare that formation of a separation membrane becomes difficult when using the nonwoven fabric as a support for a separation membrane.

The surface roughness of the long-fiber nonwoven fabric refers to a value measured by a method described in paragraph (11) in Examples described later.

To obtain the long-fiber nonwoven fabric composing the support for a separation membrane in which the average surface roughness is 2 to 9 μm, it is preferable to thermocompression bond long-fiber nonwoven fabrics with a pair of upper/lower flat rolls to unify them. Further, an aspect, in which a complex-type filament, in which a low melting point polymer having a melting point lower by 10 to 140° C. than that of a high melting point polymer is arranged about the high melting point polymer, is used as a thermoplastic continuous filament composing the long-fiber nonwoven fabric and an average fiber diameter of thermoplastic continuous filaments composing a long-fiber nonwoven fabric is set at 3 to 17 μm, is preferable for obtaining the long-fiber nonwoven fabric in which the average surface roughness is preferably 2 to 9 p.m.

In the long-fiber nonwoven fabric composing the support for a separation membrane, both stresses of elongation of 5% in a machine direction and a crosswise direction are preferably 50 to 500 N/5 cm. Both the stresses of elongation of 5% are more preferably 70 to 500 N/5 cm, and furthermore preferably 90 to 500 N/5 cm. When both stresses of elongation of 5% in a machine direction and a crosswise direction of the long-fiber nonwoven fabric are 50 N/5 cm or more, this means that the long-fiber nonwoven fabric is hardly distorted by any force applied to a machine direction or a crosswise direction, and in the case where the long-fiber nonwoven fabric is used as a support for a separation membrane, the long-fiber nonwoven fabric stands a force whichever direction the force is applied to, and it is possible to suppress the depression of the separation membrane into a groove even when a particularly high reverse osmotic pressure is applied to the separation membrane. Further, when both the stresses of elongation of 5% in a machine direction and a crosswise direction of the long-fiber nonwoven fabric are 500 N/5 cm or less, it never occurs that productivity and cost of the long-fiber nonwoven fabric are significantly deteriorated, and handling of the long-fiber nonwoven fabric hardly becomes difficult due to a too hard sheet.

The stress of elongation of 5% of the long-fiber nonwoven fabric refers to a value measured by a method described in paragraph (12) in Examples described later.

To obtain the long-fiber nonwoven fabric composing the support for a separation membrane in which both stresses of elongation of 5% in a machine direction and a crosswise direction are 50 to 500 N/5 cm, it is preferable to use the long-fiber nonwoven fabric substantially comprising only spunbonded nonwoven fabric(s) or to use a spunbonded nonwoven fabric for at least one layer in a laminated body when the long-fiber nonwoven fabric is the laminated body consisting of a plurality of nonwoven fabric layers. Further, an aspect of using a complex-type filament, in which a low melting point polymer having a melting point lower by 10 to 140° C. than that of a high melting point polymer is arranged about the high melting point polymer, is used as a thermoplastic continuous filament composing the long-fiber nonwoven fabric is also preferable for obtaining the long-fiber nonwoven fabric in which both stresses of elongation of 5% in a machine direction and a crosswise direction are 50 to 500 N/5 cm.

In the long-fiber nonwoven fabric composing the support for a separation membrane, a ratio of stress of elongation of 5% in a machine direction to stress of elongation of 5% in a crosswise direction is preferably 1.0 to 2.7. The ratio between the machine direction and the machine direction is more preferably 1.0 to 2.5, and furthermore preferably 1.0 to 2.3. When the ratio of stress of elongation of 5% in a machine direction to that in a crosswise direction is 1.0 or more, it is possible to prevent the productivity of the long-fiber nonwoven fabric from significantly deteriorating. Further, when the ratio of stress of elongation of 5% in a machine direction to that in a crosswise direction is 2.7 or less, whichever direction a force is applied to, the separation membrane stands the force, and it is possible to suppress the depression of the separation membrane into a groove even when a particularly high reverse osmotic pressure is applied to the separation membrane.

The ratio of stress of elongation of 5% in a machine direction to stress of elongation of 5% in a crosswise direction of the long-fiber nonwoven fabric refers to a value measured by a method described in paragraph (12) in Examples described later.

To obtain the long-fiber nonwoven fabric composing the support for a separation membrane in which the ratio of stress of elongation of 5% in a machine direction to stress of elongation of 5% in a crosswise direction is 1.0 to 2.7, it is preferable to use the long-fiber nonwoven fabric substantially comprising only spunbonded nonwoven fabric(s) or to use a spunbonded nonwoven fabric for at least one layer in a laminated body when the long-fiber nonwoven fabric is the laminated body consisting of a plurality of nonwoven fabric layers. Further, an aspect of using a complex-type filament, in which a low melting point polymer having a melting point lower by 10 to 140° C. than that of a high melting point polymer is arranged about the high melting point polymer, is used as a thermoplastic continuous filament composing the long-fiber nonwoven fabric is also preferable for obtaining the long-fiber nonwoven fabric in which a ratio of stress of elongation of 5% in a machine direction to stress of elongation of 5% in a crosswise direction is 1.0 to 2.7.

It is preferable that an average fiber diameter of thermoplastic continuous filaments composing the long-fiber nonwoven fabric is 3 to 17 p.m. The average fiber diameter is more preferably 5 to 15 μm, and furthermore preferably 7 to 14 μm. When an average fiber diameter of thermoplastic continuous filaments is 3 μm or more, since a spinning property is hardly deteriorated during producing the long-fiber nonwoven fabric and air permeability of the support for a separation membrane can be maintained, peeling of a membrane in applying and spreading a polymer solution is less and a good film-forming property can be attained. On the other hand, when an average fiber diameter of thermoplastic continuous filaments is 17 μm or less, since the long-fiber nonwoven fabric and the support for a separation membrane, which are superior in uniformity, can be attained and the support for a separation membrane can be more dense, excessive permeation in applying and spreading a polymer solution is less and an excellent film-forming property can be attained.

The average fiber diameter of thermoplastic continuous filaments refers to a value measured by a method described in paragraph (13) in Examples described later.

Weight per unit area of the long-fiber nonwoven fabric composing the support for a separation membrane is preferably 20 to 150 g/m². The weight per unit area is more preferably 30 to 120 g/m², and furthermore preferably 40 to 90 g/m². When the weight per unit area is 20 g/m² or more, excessive permeation in applying and spreading a polymer solution is less and an excellent film-forming property can be attained, and a separation membrane having excellent mechanical strength and excellent durability can be obtained. On the other hand, when the weight per unit area is 150 g/m² or less, a thickness of the separation membrane can be reduced to increase an area of the separation membrane per a fluid separation element unit.

The weight per unit area of the long-fiber nonwoven fabric refers to a value measured by a method described in paragraph (6) in Examples described later.

A thickness of the long-fiber nonwoven fabric composing the support for a separation membrane is preferably 0.03 to 0.20 mm. The thickness is more preferably 0.04 to 0.16 mm, and furthermore preferably 0.05 to 0.12 mm. When the thickness of the long-fiber nonwoven fabric is 0.03 mm or more, excessive permeation in applying and spreading a polymer solution is less and an excellent film-forming property can be attained, and a separation membrane having excellent mechanical strength and excellent durability can be obtained. On the other hand, when the thickness of the long-fiber nonwoven fabric is 0.20 mm or less, a thickness of the separation membrane can be reduced to increase an area of the separation membrane per a fluid separation element unit.

The thickness of the long-fiber nonwoven fabric refers to a value measured by a method described in paragraph (7)A in Examples described later.

Next, a method for producing the long-fiber nonwoven fabric composing the support for a separation membrane will be described.

The long-fiber nonwoven fabric can provide a separation membrane which exhibits an excellent film-forming property in forming the separation membrane on a support and has excellent durability, and it can be preferably produced by a spunbonding method or a melt blowing method.

The spunbonding method is a method in which a melted thermoplastic polymer is extruded and drawn by suction of a high speed suction gas to be spun into fibers, and then the resulting fibers were collected on a moving conveyer to form fibrous webs, and the fibrous webs are successively subjected to thermocompression bonding and entangled bonding to form a sheet-like unified long-fiber nonwoven fabric. In the case of the spunbonding method, a spinning speed is preferably 2000 m/min or more to highly orient and crystallize constituent fibers. The spinning speed is more preferably 3000 m/min or more, and furthermore preferably 4000 m/min or more. In the case of bringing thermoplastic continuous filaments into a complex form of a core-sheath type, a common method for forming a complex can be employed.

The melt blowing method is a method in which by blowing a heated high speed gas stream on a melted thermoplastic polymer, the thermoplastic polymer is drawn into an extra-fine fiber and the extra-fine fibers are collected to form a sheet-like long-fiber nonwoven fabric.

Furthermore, to obtain a separation membrane having a good film-forming property and excellent mechanical strength and excellent durability in forming a separation membrane, it is preferable to unify a long-fiber nonwoven fabric obtained by a spunbonding method in the form of a sheet by thermocompression bonding from the viewpoint of suppressing fuzz. As a means of unifying, there is a method of thermocompression bonding long-fiber nonwoven fabrics with a pair of upper/lower flat rolls to unify them. This flat roll is a metal roll or an elastic roll which is not provided with pits and projections on the surface of the roll. The metal roll and another metal roll can be used in a pair, or the metal roll and the elastic roll can be used in a pair. Particularly, since by inhibiting the fusion of fibers at the surface of the long-fiber non-woven fabric to maintain a form of the nonwoven fabric, an anchoring effect of suppressing peeling of the separation membrane is achieved when using the nonwoven fabric as a support for a separation membrane, a method, in which the long-fiber nonwoven fabric is thermocompression bonded with a heated metal roll and an elastic roll not heated, is preferably employed.

The elastic roll refers to a roll made of a material having elasticity compared with the metal roll. Examples of materials of the elastic roll include paper, cotton and aramide paper (so-called paper roll), and include an urethane resin, an epoxy resin, a silicon resin and hard rubber (resin roll).

A temperature of a heated flat roll is preferably lower by 80 to 20° C. than a melting point of a polymer composing at least the surface of thermoplastic continuous filament composing the long-fiber nonwoven fabric, and more preferably lower by 60 to 30° C. Further, in the case of the complex-type filament made of polymers having different melting points, in which a low melting point polymer having a melting point lower by 10 to 140° C. than that of a high melting point polymer is arranged about the high melting point polymer, a temperature of the flat roll is preferably lower by 80 to 20° C. than a melting point of the low melting point polymer, and more preferably lower by 60 to 30° C.

Furthermore, it is preferable that a temperature difference is made between upper/lower flat rolls, and a temperature of flat roll on a high-temperature side is set at a temperature lower by 80 to 20° C. than a melting point of a polymer composing the surface of thermoplastic continuous filament composing the long-fiber nonwoven fabric and a temperature of flat roll on a low-temperature side is set at a temperature lower by 40 to 120° C. than that of the flat roll on a high-temperature side. When the temperature difference between the flat roll on a low-temperature side and the flat roll on a high-temperature side is 40° C. or more, formation of an extremely high density portion at the surface of the long-fiber nonwoven fabric can be suppressed, and peeling of a membrane due to insufficient permeation in applying and spreading a polymer solution is less and a good film-forming property can be attained. On the other hand, when the temperature difference between the flat roll on a low-temperature side and the flat roll on a high-temperature side is 120° C. or less, delamination of the laminated long-fiber nonwoven fabric can be suppressed, and excessive permeation in applying and spreading a polymer solution is less and an excellent film-forming property can be attained. The temperature of flat roll on a high-temperature side is more preferably set at a temperature lower by 60 to 30° C. than a melting point of a polymer composing the surface of thermoplastic continuous filament composing the long-fiber nonwoven fabric. Further, the temperature of flat roll on a low-temperature side is more preferably set at a temperature lower by 60 to 100° C. than that of flat roll on a high-temperature side.

Further, a line pressure of the flat rolls is preferably 20 to 500 kg/cm. The line pressure is more preferably 50 to 500 kg/cm, and furthermore preferably 100 to 500 kg/cm. When the line pressure of the flat rolls is 20 kg/cm or more, delamination of the laminated long-fiber nonwoven fabric can be suppressed, and excessive permeation in applying and spreading a polymer solution is less and an excellent film-forming property can be attained. On the other hand, when the line pressure of the flat rolls is 500 kg/cm or less, formation of an extremely high density portion at the surface of the long-fiber nonwoven fabric can be suppressed, and peeling of a membrane due to insufficient permeation in applying and spreading a polymer solution is less and a good film-forming property can be attained.

Further, instead of a method of thermocompression bonding long-fiber nonwoven fabrics with only a pair of flat rolls, a method of bonding the long-fiber nonwoven fabrics in two steps to more precisely control the characteristics of the long-fiber nonwoven fabric can also be employed. That is, a two step bonding method, in which the long-fiber nonwoven fabrics are preliminarily thermocompression bonded between a pair of flat rolls or between one flat roll and a collecting conveyor used for collecting fibrous web to obtain a long-fiber nonwoven fabric in a state of temporary bonding, and then in a continuous step or after the long-fiber nonwoven fabric in a state of temporary bonding is taken up, the long-fiber nonwoven fabrics are thermocompression bonded again between flat rolls, can also be employed. In the preliminary thermocompression bonding at a first step in the two step bonding method, a packed density of the long-fiber nonwoven fabric in a state of temporary bonding is preferably set at 0.1 to 0.3 since the long-fiber nonwoven fabric can be more dense during the thermocompression bonding at a second step. In doing so, a temperature of flat rolls used for pre-thermocompression bonding in the first step is preferably lower by 120 to 20° C. than a melting point of a fiber composing the long-fiber nonwoven fabric, and a line pressure of the flat rolls is preferably 5 to 70 kg/cm.

Further, in the case of the laminated long-fiber nonwoven fabric, by forming a high-density layer at an interface between laminated layers, it is possible that excessive permeation in applying and spreading a polymer solution is less and an excellent film-forming property is attained. From this, a method, in which long-fiber nonwoven fabrics composed of thermoplastic continuous filaments are preliminarily thermocompression bonded between a pair of upper/lower flat rolls, or between one flat roll and a collecting conveyor used for collecting fibrous web, and in a continuous step or after the nonwoven fabric in a state of temporary bonding, in which a high-density layer is formed on a surface side and/or a backside, is taken up, plural sheets of the nonwoven fabric in a state of temporary bonding, preliminarily thermocompression bonded, are superimposed on one another, and the resulting laminated body is thermocompression bonded again between a pair of upper/lower flat rolls and unified, is preferably used.

Herein, a temperature of the flat roll in obtaining the nonwoven fabric in a state of temporary bonding, preliminarily thermocompression bonded, is preferably lower by 120 to 20° C. than a melting point of the thermoplastic continuous filament, and more preferably lower by 100 to 40° C. When a difference between the temperature of the flat roll and the melting point of the thermoplastic continuous filament is 120° C. or less, a high-density layer can be formed on a surface side and/or a backside of the long-fiber nonwoven fabric. Further, when the difference is 20° C. or more, it never occurs the fusing on a surface side and/or a backside of the long-fiber nonwoven fabric proceeds excessively to make it difficult to unify the long-fiber nonwoven fabric.

Further, a line pressure in obtaining the nonwoven fabric in a state of temporary bonding, preliminarily thermocompression bonded, is preferably 5 to 70 kg/cm, and more preferably 10 to 60 kg/cm.

As described above, the long-fiber nonwoven fabric composing the support for a separation membrane may be a long-fiber nonwoven fabric comprising a single layer, but a laminated body comprising a plurality of long-fiber nonwoven fabric layers is also a preferable form since a support for a separation membrane which is more superior in uniformity can be obtained. As a method for producing a laminated body comprising two layers of spunbonded nonwoven fabrics as a laminated body, a method, in which two sheets of the spunbonded nonwoven fabrics in a state of temporary bonding, obtained by preliminarily thermocompression bonding between a pair of flat rolls by the above-mentioned two step bonding method, are superimposed on one another, and then thermocompression bonded again between flat rolls, is preferably employed.

Further, as a method for producing a laminated body of a three-layer structure formed by interposing a melt blowing layer between two-layered spunbonded nonwoven fabric layers, a method, in which a melt blowing nonwoven fabric produced in another line is added in a manner of interposing between two layers of the spunbonded nonwoven fabrics in a state of temporary bonding, obtained by preliminarily thermocompression bonding between a pair of flat rolls by the above-mentioned two step bonding method, and then the nonwoven fabric of the three-layer structure is thermocompression bonded again between flat rolls, is adopted.

Further, as another method for producing a laminated body of a three-layer structure, a method, in which fibrous webs extruded from a nozzle for spunbonding, a nozzle for melt blowing and a nozzle for spunbonding, located above a series of collecting conveyers, respectively, and fibrosed are successively collected, laminated and thermocompression bonded, can be employed.

Furthermore, as another method for producing a laminated body of a three-layer structure, a method, in which fibrous webs extruded from a nozzle for spunbonding, a nozzle for melt blowing and a nozzle for spunbonding, located above a series of collecting conveyers, respectively, and fibrosed are successively collected and laminated, and the resulting laminated fibrous webs are preliminarily thermocompression bonded between a flat roll placed on a collecting conveyer and the conveyor, and in a continuous step or after a sheet in a state of temporary bonding is produced and taken up, the sheet is thermocompression bonded again between a pair of flat rolls, can also be preferably employed.

The long-fiber nonwoven fabric produced by a melt blowing method can be produced by blowing a heated high speed gas stream on a melted thermoplastic polymer to draw the thermoplastic polymer into an extra-fine fiber and collecting the extra-fine fiber to form a sheet.

The separation membrane is a separation membrane formed by forming a membrane having a separation function on the above-mentioned support for a separation membrane. Examples of such a separation membrane include semipermeable membrane such as a microfiltration membrane, an ultrafiltration membrane, a nanofiltration membrane and a reverse osmotic membrane. As a method for producing of a separation membrane, a method of applying and spreading a polymer solution on at least one surface of the support for a separation membrane to form a membrane having a separation function to obtain a separation membrane is preferably used. Further, in the case where the separation membrane is a semipermeable membrane, a form, in which the membrane having a separation function is brought into a complex-type membrane including a supporting layer and a semipermeable membrane layer, and this complex-type membrane is laminated on at least one surface of the support for a separation membrane, is also preferable. In this case, the supporting layer does not have to have the separation function.

The polymer solution applied and spread on the support for a separation membrane comes to have a separation function at the time of becoming a membrane, and for example, solutions of polysulfone, polyarylethersulfone such as polyethersulfone, polyimide, poly(vinylidene fluoride), or cellulose acetate are preferably used. Among others, solutions of polysulfone and polyarylethersulfone are preferably used in point of chemical stability, mechanical stability and thermal stability. A solvent can be appropriately selected in accordance with a material for forming a membrane. Further, as a semipermeable membrane in the case where the separation membrane is a complex-type membrane including a supporting layer and a semipermeable membrane layer, a membrane of crosslinked polyamide, which is obtained by polycondensation of polyfunctional acid halide and polyfunctional amine, is preferably used.

The fluid separation element refers to a fluid separation element in which the separation membrane is housed in a case for convenience of handling. Examples of its configuration include a plate frame type of a plain membrane, a pleat-shaped type, and a spiral type. Among others, the spiral type element, in which the separation membrane is wound in a spiral fashion around a water collecting pipe together with the material of a permeated liquid flow passage and a material of a feed liquid flow passage, is preferably employed. Further, a plurality of fluid separation elements may be connected in series or in parallel to form a separation membrane unit.

EXAMPLES

Next, our membranes and methods will be described specifically by way of examples, but this disclosure is not limited to these examples. Characteristic values of the aforementioned support for a separation membrane, long-fiber nonwoven fabric composing the support for a separation membrane and thermoplastic continuous filaments composing the long-fiber non-woven fabric, and characteristic values in the following examples are measured by the following methods.

(1) Melting Point of Resin (° C.)

Measurement was performed at a temperature raising speed of 20° C./min using a differential scanning calorimeter DSC-2 manufactured by PerkinElmer Japan Co Ltd. and a temperature taking an extremum in a melting endothermic curve obtained was considered as a melting point of a resin. Further, as for a resin, a melting endothermic curve of which does not exhibit an extremum in the differential scanning calorimeter, the resin was heated on a hot plate and a temperature at which melting of the resin was observed with a microscope was considered as a melting point of the resin.

(2) Intrinsic Viscosity IV of Resin

Intrinsic viscosity IV of a polyethylene terephthalate resin was measured by the following method.

8 g of sample was dissolved in 100 ml of o-chlorophenol, and relative viscosity $\eta_r$ was determined from the following equation:

$$\eta_r = \eta/\eta_0 = (t \times d)/(t_0 \times d_0),$$

using a Ostwald viscometer at 25° C.,
$\eta$: viscosity of a polymer solution,
$\eta_0$: viscosity of o-chlorophenol
t: falling time of a solution (sec), d: density of a solution (g/cm³)

$t_0$: falling time of o-chlorophenol (sec), and $d_0$: density of o-chlorophenol (g/cm³).

Next, the intrinsic viscosity IV of the resin was calculated from the following equation based on the relative viscosity $\eta_r$:

$$IV = 0.0242\, \eta_r + 0.2634.$$

(3) Tensile Strength (N/5 cm) and Tensile Elongation (%) of Long-Fiber Nonwoven Fabric (%)

According to 5.3.1 of JIS L 1906 (2000), tensile strength and tensile elongation were measured on five locations in long-fiber nonwoven fabric samples with a size of 5 cm×30 cm for each of a test in a vertical direction and a test in a lateral direction under the conditions of a chuck distance of 20 cm and a tensile speed of 10 cm/min, and strength and elongation at the time of stretching the sample to break were read out. Measurements were rounded off to unit and the resulting values were considered as tensile strength and tensile elongation in a machine direction (MD) and in a crosswise direction (CD). Further, a ratio of tensile strength in a machine direction to tensile strength in a crosswise direction was determined by dividing the tensile strength in a machine direction by the tensile strength in a crosswise direction and rounding off the resulting value to one decimal place.

(4) Product of Tensile Strength and Tensile Elongation of Long-Fiber Nonwoven Fabric (N/5 cm)

Based on tensile strength and tensile elongation in a machine direction (MD) and in a crosswise direction (CD) measured in the above paragraph (3), a product of tensile strength and tensile elongation was calculated by the following equation and the resulting value were rounded off to unit, and the resulting values were considered as a product of tensile strength and tensile elongation in a machine direction (MD) and in a crosswise direction (CD):

$$\text{Product of tensile strength and tensile elongation}[N/5\text{ cm}] = \text{tensile strength}[N/5\text{ cm}] \times (1 + \text{tensile elongation}[\%]/100).$$

(5) Coefficient Of Variance Of Luminance Of Transmitted Light Of Long-Fiber Nonwoven Fabric (%)

Three long-fiber nonwoven fabric samples with a size of 10 cm×10 cm were extracted, and these samples were superimposed on one another against a black drawing paper and set in a scanner (GT-X750 manufactured by SEIKO EPSON CORP.) and read at resolution of 1200 dpi by the image scanner. Moreover, read image files was processed by an image processing software (AT-Image Ver. 3.2) to quantify an average of luminance. Coefficient of variance of luminance of transmitted light was determined from a standard deviation of the average value and rounded off to one decimal place.

(6) Weight Per Unit Area of Long-Fiber Nonwoven Fabric (g/m²)

Three long-fiber nonwoven fabric samples with a size of 30 cm×50 cm were extracted and each sample was weighed, and an average of the obtained weight values was converted to a weight per unit area and the converted value was rounded off to unit.

(7) Thickness of Long-Fiber Nonwoven Fabric (mm)

A. Thickness at Normal Load

According to 5.1 of JIS L 1906 (2000), thicknesses of 10 locations equally spaced per 1 m length in a width direction of a long-fiber nonwoven fabric were measured in hundredth of a millimeter, applying a load of 10 kPa by use of an indenter of 10 mm in diameter, and an average value of measurements was rounded off to two decimal places.

B. Thickness at Low Load

Thicknesses of arbitrary 15 locations in a long-fiber nonwoven fabric having a size of 30 cm×50 cm were measured in hundredth of a millimeter, applying a load of 2 kPa by use of an indenter of 16 mm in diameter, and an average value of measurements was rounded off to two decimal places.

C. Thickness at High Load

Thicknesses of arbitrary 15 locations in a long-fiber nonwoven fabric having a size of 30 cm×50 cm were measured in hundredth of a millimeter, applying a load of 200 kPa by use of an indenter of 16 mm in diameter, and an average value of measurements was rounded off to two decimal places.

(8) Packed Density of Long-Fiber Nonwoven Fabric

Based on weight per unit area (g/m²) and a thickness (mm) at a normal load, which are determined in the above paragraphs (6) and (7)A, respectively, and a polymer (resin) density, a packed density was calculated by the following equation and the resulting value were rounded off to one decimal places:

$$\text{Packed density} = \text{weight per unit area}(g/m^2)/\text{thickness}(mm)/10^3/\text{polymer density}(g/cm^3).$$

(9) Air Permeability of Long-Fiber Nonwoven Fabric (cc/cm²/sec)

Air permeability of arbitrary 45 points in a long-fiber nonwoven fabric of 30 cm×50 cm was measured at a pressure of 125 Pa by a barometer according to 4.8 (1) fragile-type method of JIS L 1906 (2000). An average value of measurements was rounded off to one decimal place.

(10) Change Rate Between Thickness at Low Load and Thickness at High Load of Long-Fiber Nonwoven Fabric (mm)

A value obtained by subtracting the thickness (mm) at a high load determined in the above paragraph (7)C from the thickness (mm) at a low load determined in the above paragraph (7)B was taken as a change rate between a thickness at a low load and a thickness at a high load.

(11) Average Surface Roughness Ra of Long-Fiber Nonwoven Fabric (μm)

According to definition described in 3.1 of JIS B 0601 (1994), average surface roughness Ra (arithmetic mean) was determined using Surf Corder SE-40C manufactured by Kosaka Laboratory Ltd. Measurement was performed under the conditions of a cut off value 2.5 mm, an evaluation length 12.5 mm and a measuring speed 0.5 mm/s for two cases where a length direction (lengthwise) of a long-fiber nonwoven fabric samples with a size of 30 cm×50 cm is an evaluation length direction and a width direction (crosswise) of a long-fiber nonwoven fabric samples is an evaluation length direction, and number of measuring locations per one direction is 10 for each of a front side and a back side, and therefore 40 locations were measured. An average was rounded off so as to have one significant figure, and the resulting value was taken as surface roughness Ra (μm).

(12) Stress of Elongation of 5% of Long-Fiber Nonwoven Fabric (N/5 cm)

According to 5.3.1 of JIS L 1906 (2000), tensile strength and tensile elongation were measured on five locations in long-fiber nonwoven fabric samples with a size of 5 cm×30 cm for each of a test in a vertical direction and a test in a lateral direction under the conditions of a chuck distance of 20 cm and a tensile speed of 10 cm/min, and stress of elongation of 5% was read out from the resulting tensile strength/tensile elongation curve, and these stress values were rounded off to unit and the resulting values were considered as stress of elongation of 5% in a machine direction (MD) and in a crosswise direction (CD). Further, a ratio of tensile strength in a machine direction to tensile strength in a crosswise direction was determined by dividing the tensile strength in a machine direction by the tensile strength in a crosswise direction and rounding off the resulting value to one decimal place.

(13) Fiber Diameter (μm)

Ten small samples are extracted at random from the long-fiber nonwoven fabric and photographs of magnifications of 500 to 3000 times are taken with a scanning electron microscope, and 10 fibers per each sample, 100 fibers in total, are selected at random to measure its fiber diameter. A fiber diameter was determined by rounding off an average of these fiber diameters to unit.

(14) Degree of Strike Through of Cast Liquid During Film Formation

Reverse Osmosis Membrane for Seawater Desalination

On each support for a separation membrane, 15% by weight dimethylformamide solution (cast liquid) of polysulfone ("Udel"(registered trade mark)-P3500 manufactured by SOLVAY Advanced Polymers Co., Ltd.) was casted in a thickness of 50 μm at room temperature (20° C.), and immediately the support for a separation membrane was dipped into pure water at room temperature (20° C.) and left standing for 5 minutes to prepare a separation membrane made of polysulfone.

Next, a backside of the prepared reverse osmosis membrane was visually observed, and a degree of strike through of a cast liquid was rated on the following scale of 1 to 5. Score 4 or more means acceptance.

Score 5: There is no strike through of a cast liquid.
Score 4: There is a little strike through of a cast liquid (area ratio less than 5%).
Score 3: There is strike through of a cast liquid (area ratio between 5% and 50%).
Score 2: There is strike through of a cast liquid in most area (area ratio between 51% and 80%).
Score 1: There is strike through of a cast liquid in almost whole area.

(15) Depression Rate of Separation Membrane (μm)

Using a material of a feed liquid flow passage comprising mesh-like fabric, the above-mentioned reverse osmosis membrane for seawater desalination, a pressure-proof sheet, and the following material of a permeated liquid flow passage, a spiral type fluid separation element having an effective area of 40 m² was prepared.

Material of a Permeated Liquid Flow Passage

A polyester single tricot in which a groove width is 200 μm, a groove depth is 150 μm, groove density is 40/inch, and a thickness is 200 μm, was used.

Next, a durability test of the prepared fluid separation element was prepared under the conditions of a reverse osmotic pressure of 7 MPa, a salt concentration of sea water of 3% by weight and operation temperature 40° C., and after 1000 hours operation, the fluid separation element was disassembled and a depression rate of a separation membrane into the material of a permeated liquid flow passage was measured. Photographs of separation membrane cross sections of arbitrary 3 locations of a fluid separation element were taken at a magnification of 500 to 3000 times with a scanning electron microscope and to measure the depression rate (unit: μm). An average of measurements was rounded off to unit to determine the depression rate. With respect to a direction in which the support for a separation membrane is superimposed on the material of a permeated liquid flow passage, test was performed with two directions; that is, a nonwoven fabric length direction (lengthwise) of the support for a separation membrane is orthogonal to a groove direction of the material of a permeated liquid flow passage, and a nonwoven fabric width direction (crosswise) of the support for a separation membrane is orthogonal to a groove direction of the material of a permeated liquid flow passage.

Example 1

A polyethylene terephthalate (PET) resin (a) having intrinsic viscosity IV of 0.65 and a melting point of 260° C., which was dried to a water content of 50 ppm or less and contains 0.3% by weight of titanium oxide, and a copolymerization polyester resin (b) having intrinsic viscosity IV of 0.66 and a melting point of 230° C., which was dried to a water content of 50 ppm or less and contains 0.2% by weight of titanium oxide, in which a copolymerization ratio of isophthalic acid was 10 mole %, were prepared.

The above-mentioned polyethylene terephthalate resin (a) and copolymerization polyester resin (b) were melted at 295° C. and 280° C., respectively. These polyethylene terephthalate resin (a) and copolymerization polyester resin (b) were extruded from a pore as a core component and a sheath component, respectively, at a nozzle temperature of 300° C. in proportions of the core and the sheath of 80:20 by weight, and these components were spun into concentric filaments of a core-sheath type having a circular cross section at a spinning speed of 4300 m/min with an ejector, and the resulting filaments were collected as a fibrous web on a moving net conveyor. The collected fibrous web was supported between a pair of upper/lower steel flat rolls and thermocompression bonded at a line pressure of 60 kg/cm by the flat rolls whose surface temperatures were 190° C. to produce a spunbonded nonwoven fabric in which a fiber diameter of a continuous filament was 11 μm, weight per unit area was 80 g/m² and a thickness was 0.11 mm to obtain a support for a separation membrane. The results are shown in Table 1.

Example 2

The polyethylene terephthalate resin (a) and the copolymerization polyester resin (b), which were used in Example 1, were melted at 295° C. and 280° C., respectively. These polyethylene terephthalate resin (a) and copolymerization polyester resin (b) were extruded from a pore as a core component and a sheath component, respectively, at a nozzle temperature of 300° C. in proportions of the core and the sheath of 80:20 by weight, and these components were spun into concentric filaments of a core-sheath type having a circular cross section at a spinning speed of 4500 m/min with an ejector, and the resulting filaments were collected as a fibrous web on a moving net conveyor. The collected fibrous web was supported between a pair of upper/lower steel flat rolls and thermocompression bonded at a line pressure of 60 kg/cm by the flat rolls whose surface temperatures were 190° C. to produce a spunbonded nonwoven fabric in which a fiber diameter of a continuous filament was 10 μm, weight per unit area was 80 g/m² and a thickness was 0.10 mm to obtain a support for a separation membrane. The results are shown in Table 1.

Example 3

The polyethylene terephthalate resin (a) and the copolymerization polyester resin (b), which were used in Example 1, were melted at 295° C. and 280° C., respectively. These polyethylene terephthalate resin (a) and copolymerization polyester resin (b) were extruded from a pore as a core component and a sheath component, respectively, at a nozzle temperature of 300° C. in proportions of the core and the sheath of 85:15 by weight, and these components were spun into concentric filaments of a core-sheath type having a circular cross section at a spinning speed of 4300 m/min with an ejector, and the resulting filaments were collected as a fibrous web on a moving net conveyor. The collected fibrous web was supported between a pair of upper/lower steel flat rolls and thermocompression bonded at a line pressure of 60 kg/cm by the flat rolls whose surface temperatures were 190° C. to produce a spunbonded nonwoven fabric in which a fiber diameter of a continuous filament was 11 μm, weight per unit area was 50 g/m$^2$ and a thickness was 0.08 mm to obtain a support for a separation membrane. The results are shown in Table 1.

Example 4

The polyethylene terephthalate resin (a) and the copolymerization polyester resin (b), which were used in Example 1, were melted at 295° C. and 280° C., respectively. These polyethylene terephthalate resin (a) and copolymerization polyester resin (b) were extruded from a pore as a core component and a sheath component, respectively, at a nozzle temperature of 300° C. in proportions of the core and the sheath of 80:20 by weight, and these components were spun into concentric filaments of a core-sheath type having a circular cross section at a spinning speed of 4500 m/min with an ejector, and the resulting filaments were collected as a fibrous web on a moving net conveyor. The collected fibrous web was supported between a pair of upper/lower steel flat rolls and preliminarily thermocompression bonded at a line pressure of 60 kg/cm by the flat rolls whose surface temperatures were 140° C. to produce a spunbonded nonwoven fabric in which a fiber diameter of a continuous filament was 10 μm, weight per unit area was 70 g/m$^2$ and a thickness was 0.25 mm.

The obtained spunbonded nonwoven fabric was supported between a pair of flat rolls in which an upper flat roll was made of steel and a lower flat roll was made of an urethane resin, and after only the upper flat roll was heated so that its surface temperature was 170° C. and a surface temperature of the resin roll was stabilized at 100° C., the spunbonded nonwovens was further thermocompression bonded at a line pressure of 170 kg/cm to produce a spunbonded non-woven fabric in which weight per unit area was 70 g/m$^2$ and a thickness was 0.10 mm to obtain a support for a separation membrane. The results are shown in Table 1.

TABLE 1

| | | Example 1 | Example 2 | Example 3 | Example 4 |
|---|---|---|---|---|---|
| | Resin*[1] | PET/co-PET | PET/co-PET | PET/co-PET | PET/co-PET |
| | Species of sheet | Spunbonded nonwoven fabric | Spunbonded nonwoven fabric | Spunbonded nonwoven fabric | Spunbonded nonwoven fabric |
| | Spinning speed (m/min) | 4300 | 4500 | 4300 | 4500 |
| | Number of layers | 1 | 1 | 1 | 1 |
| | Bonding method | one step | one step | one step | two step |
| Thermo-compression bonding roll | Species of roll upper/lower | steel/steel | steel/steel | steel/steel | steel/resin |
| | Surface temperature upper/lower (° C.) | 190/190 | 190/190 | 190/190 | 170/100 |
| | Line pressure (kg/cm) | 60 | 60 | 60 | 170 |
| | Fiber diameter (μm) | 11 | 10 | 11 | 10 |
| | Weight per unit area (g/m$^2$) | 80 | 80 | 50 | 70 |
| Thickness (mm) | at normal load | 0.11 | 0.10 | 0.08 | 0.10 |
| | at low load | 0.12 | 0.11 | 0.09 | 0.11 |
| | at high load | 0.11 | 0.10 | 0.08 | 0.10 |
| | Change rate of thickness (mm) | 0.01 | 0.01 | 0.01 | 0.01 |
| | Density (g/cm$^3$) | 0.7 | 0.8 | 0.6 | 0.7 |
| | Packed density | 0.5 | 0.6 | 0.5 | 0.5 |
| Tensile strength (N/5 cm) | Machine direction (MD) | 415 | 419 | 230 | 387 |
| | Crosswise direction (CD) | 178 | 197 | 105 | 178 |
| | Ratio of machine direction to crosswise direction | 2.3 | 2.1 | 2.2 | 2.2 |
| Tensile elongation (%) | Machine direction (MD) | 23 | 23 | 25 | 29 |
| | Crosswise direction (CD) | 18 | 22 | 20 | 24 |
| Product of tensile strength and tensile elongation (N/5 cm) | Machine direction (MD) | 510 | 515 | 288 | 499 |
| | Crosswise direction (CD) | 210 | 240 | 126 | 221 |
| Stress of elongation of 5% (N/5 cm) | Machine direction (MD) | 260 | 263 | 136 | 230 |
| | Crosswise direction (CD) | 140 | 158 | 73 | 119 |
| | Ratio of machine direction to crosswise direction | 1.9 | 1.7 | 1.9 | 1.9 |

TABLE 1-continued

|  | | Example 1 | Example 2 | Example 3 | Example 4 |
|---|---|---|---|---|---|
| Coefficient of variance of luminance of transmitted light (%) | | 4.4 | 4.2 | 4.6 | 4.3 |
| Air permeability (cc/cm$^2$/sec) | | 2.0 | 1.8 | 8.9 | 2.5 |
| Surface roughness Ra (μm) | | 4 | 4 | 4 | 4 |
| Degree of strike through of cast liquid during film formation (number of points) | | 4 | 4 | 4 | 4 |
| Depression rate of separation membrane (μm) | Machine direction of nonwoven fabric | 25 | 25 | 32 | 28 |
| | Crosswise direction of nonwoven fabric | 33 | 32 | 38 | 36 |

*[1]PET: polyethylene terephthalate, co-PET: copolymerization polyethylene terephthalate

Example 5

The polyethylene terephthalate resin (a) and the copolymerization polyester resin (b), which were used in Example 1, were melted at 295° C. and 280° C., respectively. These polyethylene terephthalate resin (a) and copolymerization polyester resin (b) were extruded from a pore as a core component and a sheath component, respectively, at a nozzle temperature of 300° C. in proportions of the core and the sheath of 80:20 by weight, and these components were spun into concentric filaments of a core-sheath type having a circular cross section at a spinning speed of 4500 m/min with an ejector, and the resulting filaments were collected as a fibrous web on a moving net conveyor. The collected fibrous web was supported between a pair of upper/lower steel flat rolls and preliminarily thermocompression bonded at a line pressure of 60 kg/cm by the flat rolls whose surface temperatures were 140° C. to produce a spunbonded non-woven fabric in which a fiber diameter of a continuous filament was 10 μm, weight per unit area was 75 g/m$^2$ and a thickness was 0.38 mm.

The obtained spunbonded nonwoven fabric was supported between a pair of upper/lower steel flat rolls, and after the flat rolls were heated so that a surface temperature of the upper steel flat roll was 170° C. and a surface temperature of the lower steel flat roll was 90° C., the spunbonded nonwoven was thermocompression bonded at a line pressure of 170 kg/cm to produce a spunbonded nonwoven fabric in which weight per unit area was 75 g/m$^2$ and a thickness was 0.10 mm to obtain a support for a separation membrane. The results are shown in Table 2.

Example 6

The polyethylene terephthalate resin (a) and the copolymerization polyester resin (b), which were used in Example 1, were melted at 295° C. and 280° C., respectively. These polyethylene terephthalate resin (a) and copolymerization polyester resin (b) were extruded from a pore as a core component and a sheath component, respectively, at a nozzle temperature of 300° C. in proportions of the core and the sheath of 80:20 by weight, and these components were spun into concentric filaments of a core-sheath type having a circular cross section at a spinning speed of 4500 m/min with an ejector, and the resulting filaments were collected as a fibrous web on a moving net conveyor. The collected fibrous web was supported between a pair of upper/lower steel flat rolls and preliminarily thermocompression bonded at a line pressure of 60 kg/cm by the flat rolls whose surface temperatures were 140° C. to produce a spunbonded non-woven fabric in which a fiber diameter of a continuous filament was 10 μm, weight per unit area was 35 g/m$^2$ and a thickness was 0.15 mm.

Two sheets of the obtained spunbonded nonwoven fabrics were superimposed on each other, and the superimposed spunbonded nonwovens were supported between a pair of flat rolls in which an upper flat roll was made of steel and a lower flat roll was made of an urethane resin, and after only the upper flat roll was heated to 170° C. and a surface temperature of the resin flat roll was stabilized at 100° C., the superimposed spunbonded nonwovens were further thermocompression bonded at a line pressure of 170 kg/cm to produce a spunbonded nonwoven fabric in which weight per unit area was 70 g/m$^2$ and a thickness was 0.10 mm to obtain a support for a separation membrane. The results are shown in Table 2.

Example 7

The polyethylene terephthalate resin (a) and the copolymerization polyester resin (b), which were used in Example 1, were melted at 295° C. and 280° C., respectively. These polyethylene terephthalate resin (a) and copolymerization polyester resin (b) were extruded from a pore as a core component and a sheath component, respectively, at a nozzle temperature of 300° C. in proportions of the core and the sheath of 80:20 by weight, and these components were spun into concentric filaments of a core-sheath type having a circular cross section at a spinning speed of 4500 m/min with an ejector, and the resulting filaments were collected as a fibrous web on a moving net conveyor. The collected fibrous web was supported between a pair of upper/lower steel flat rolls and preliminarily thermocompression bonded at a line pressure of 60 kg/cm by the flat rolls whose surface temperatures were 140° C. to produce a spunbonded non-woven fabric in which a fiber diameter of a continuous filament was 10 μm, weight per unit area was 35 g/m$^2$ and a thickness was 0.15 mm.

Two sheets of the obtained spunbonded nonwoven fabrics were superimposed on each other, and the superimposed spunbonded nonwovens were supported between a pair of upper/lower steel flat rolls, and after the flat rolls were heated so that a surface temperature of the upper steel flat roll was 170° C. and a surface temperature of the lower steel flat roll was 80° C., the superimposed spunbonded nonwoven were thermocompression bonded at a line pressure of 170 kg/cm to produce a spunbonded nonwoven fabric in which weight per unit area was 70 g/m$^2$ and a thickness was 0.10 mm to obtain a support for a separation membrane. The results are shown in Table 2.

Example 8

The polyethylene terephthalate resin (a) and the copolymerization polyester resin (b), which were used in Example 1, were melted at 295° C. and 280° C., respectively. These polyethylene terephthalate resin (a) and copolymerization polyester resin (b) were extruded from a pore as a core component and a sheath component, respectively, at a nozzle temperature of 300° C. in proportions of the core and the sheath of 80:20 by weight, and these components were spun into concentric filaments of a core-sheath type having a circular cross section at a spinning speed of 4500 m/min with an ejector, and the resulting filaments were collected as a fibrous web on a moving net conveyor. The collected fibrous web was supported between a pair of upper/lower steel flat rolls and preliminarily thermocompression bonded at a line pressure of 40 kg/cm by the flat rolls whose surface temperatures were 130° C. to produce a spunbonded non-woven fabric in which a fiber diameter of a continuous filament was 10 weight per unit area was 30 g/m² and a thickness was 0.13 mm.

Further, by changing only a line speed in the above-mentioned production method, a spunbonded nonwoven fabric, in which a fiber diameter of a single fiber was 10 μm, weight per unit area was 40 g/m² and a thickness was 0.17 mm, was produced.

The spunbonded nonwoven fabric, in which weight per unit area was 30 g/m², of two spunbonded nonwoven fabrics thus obtained was superimposed on the spunbonded nonwoven fabric in which weight per unit area was 40 g/m², and the superimposed spunbonded nonwovens were supported between a pair of flat rolls in which an upper flat roll was made of steel and a lower flat roll was made of an urethane resin, and after only the upper flat roll was heated so that its surface temperature was 180° C. and a surface temperature of the lower resin flat roll was stabilized at 80° C., the superimposed spunbonded nonwovens were thermocompression bonded at a line pressure of 170 kg/cm to produce a spunbonded nonwoven fabric in which weight per unit area was 70 g/m² and a thickness was 0.10 mm to obtain a support for a separation membrane. The results are shown in Table 2.

TABLE 2

| | | Example 5 | Example 6 | Example 7 | Example 8 |
|---|---|---|---|---|---|
| | Resin*[1] | PET/co-PET | PET/co-PET | PET/co-PET | PET/co-PET |
| | Species of sheet | Spunbonded nonwoven fabric | Spunbonded nonwoven fabric | Spunbonded nonwoven fabric | Spunbonded nonwoven fabric |
| | Spinning speed (m/min) | 4500 | 4500 | 4500 | 4500 |
| | Number of layers | 1 | 2 | 2 | 2 |
| | Bonding method | two step | two step | two step | two step |
| Thermocompression bonding roll | Species of roll upper/lower | steel/steel | steel/resin | steel/steel | steel/resin |
| | Surface temperature upper/lower (° C.) | 170/90 | 170/100 | 170/80 | 180/80 |
| | Line pressure (kg/cm) | 170 | 170 | 170 | 170 |
| | Fiber diameter (μm) | 10 | 10 | 10 | 10 |
| | Weight per unit area (g/m²) | 75 | 70 | 70 | 70 |
| Thickness (mm) | at normal load | 0.10 | 0.10 | 0.10 | 0.10 |
| | at low load | 0.11 | 0.11 | 0.11 | 0.11 |
| | at high load | 0.10 | 0.10 | 0.10 | 0.10 |
| | Change rate of thickness (mm) | 0.01 | 0.01 | 0.01 | 0.01 |
| | Density (g/cm³) | 0.8 | 0.7 | 0.7 | 0.7 |
| | Packed density | 0.5 | 0.5 | 0.5 | 0.5 |
| Tensile strength (N/5 cm) | Machine direction (MD) | 401 | 397 | 388 | 414 |
| | Crosswise direction (CD) | 189 | 203 | 196 | 208 |
| | Ratio of machine direction to crosswise direction | 2.1 | 2.0 | 2.0 | 2.0 |
| Tensile elongation (%) | Machine direction (MD) | 25 | 44 | 38 | 38 |
| | Crosswise direction (CD) | 22 | 41 | 36 | 37 |
| Product of tensile strength and tensile elongation (N/5 cm) | Machine direction (MD) | 501 | 572 | 535 | 571 |
| | Crosswise direction (CD) | 231 | 286 | 267 | 285 |
| Stress of elongation of 5% (N/5 cm) | Machine direction (MD) | 232 | 220 | 220 | 226 |
| | Crosswise direction (CD) | 127 | 120 | 120 | 122 |
| | Ratio of machine direction to crosswise direction | 1.8 | 1.8 | 1.8 | 1.9 |
| | Coefficient of variance of luminance of transmitted light (%) | 4.3 | 3.6 | 3.7 | 3.6 |
| | Air permeability (cc/cm²/sec) | 2.4 | 2.2 | 2.6 | 2.4 |
| | Surface roughness Ra (μm) | 4 | 4 | 4 | 4 |
| | Degree of strike through of cast liquid during film formation (number of points) | 4 | 5 | 5 | 5 |

TABLE 2-continued

|  |  | Example 5 | Example 6 | Example 7 | Example 8 |
|---|---|---|---|---|---|
| Depression rate of separation membrane (μm) | Machine direction of nonwoven fabric | 27 | 29 | 29 | 28 |
|  | Crosswise direction of nonwoven fabric | 34 | 35 | 35 | 35 |

*[1]PET: polyethylene terephthalate, co-PET: copolymerization polyethylene terephthalate

Example 9

The polyethylene terephthalate resin (a) used in Example 1 and a polybutylene terephthalate resin (c) containing 10 mole % of isophthalic acid as a copolymerization component and having a melting point of 211° C., which was dried to a water content of 50 ppm or less, were melted at 295° C. and 260° C., respectively. These polyethylene terephthalate resin (a) and copolymerization polybutylene terephthalate resin (c) were extruded from a pore as a core component and a sheath component, respectively, at a nozzle temperature of 295° C. in proportions of the core and the sheath of 80:20 by weight, and these components were spun into concentric filaments of a core-sheath type having a circular cross section at a spinning speed of 4500 m/min with an ejector, and the resulting filaments were collected as a fibrous web on a moving net conveyor. The collected fibrous web was supported between a pair of upper/lower steel flat rolls and preliminarily thermocompression bonded at a line pressure of 50 kg/cm by the flat rolls whose surface temperatures were 130° C. to produce a spunbonded nonwoven fabric in which a fiber diameter of a continuous filament was 11 μm, weight per unit area was 30 g/m$^2$ and a thickness was 0.13 mm.

Two sheets of the obtained spunbonded nonwoven fabrics were superimposed on each other, and the superimposed spunbonded nonwovens were supported between a pair of flat rolls in which an upper flat roll was made of steel and a lower flat roll was made of an urethane resin, and after only the upper flat roll was heated to 160° C. and a surface temperature of the resin roll was stabilized at 90° C., the superimposed spunbonded nonwovens were further thermocompression bonded at a line pressure of 170 kg/cm to produce a spunbonded nonwoven fabric in which weight per unit area was 60 g/m$^2$ and a thickness was 0.09 mm to obtain a support for a separation membrane. The results are shown in Table 3.

Example 10

The polyethylene terephthalate resin (a) used in Example 1 was melted at 295° C., and the melted resin (a) was extruded from a pore at a nozzle temperature of 300° C. and spun into a continuous filament having a circular cross section at a spinning speed of 4000 m/min with an ejector, and the resulting filaments were collected as a fibrous web on a moving net conveyor. The collected fibrous web was supported between a pair of upper/lower steel flat rolls and thermocompression bonded at a line pressure of 70 kg/cm by the flat rolls whose surface temperatures were 230° C. to produce a spunbonded nonwoven fabric in which a fiber diameter of a continuous filament was 14 μm, weight per unit area was 90 g/m$^2$ and a thickness was 0.15 mm to obtain a support for a separation membrane. The results are shown in Table 3.

Example 11

The polyethylene terephthalate resin (a) used in Example 1 was extruded from a pore at a nozzle temperature of 300° C. and spun into a continuous filament having a circular cross section at a spinning speed of 4500 m/min with an ejector, and the resulting filaments were collected as a fibrous web on a moving net conveyor. The collected fibrous web was supported between a pair of upper/lower steel flat rolls and thermocompression bonded at a line pressure of 60 kg/cm by the flat rolls whose surface temperatures were 230° C. to produce a spunbonded nonwoven fabric in which a fiber diameter of a continuous filament was 12 μm, weight per unit area was 60 g/m$^2$ and a thickness was 0.09 mm to obtain a support for a separation membrane. The results are shown in Table 3.

Example 12

A poly(L-lactic acid) resin (d) having a weight average molecular weight of 150000, a Q value (Mw/Mn) of 1.51 and a melting point of 168° C. was melted at 230° C., and the melted resin (d) was extruded from a pore at a nozzle temperature of 235° C. and spun into a continuous filament having a circular cross section at a spinning speed of 4300 m/min with an ejector, and the resulting filaments were collected as a fibrous web on a moving net conveyor. The collected fibrous web was supported between a pair of upper/lower steel flat rolls and thermocompression bonded at a line pressure of 60 kg/cm by the flat rolls whose surface temperatures were 150° C. to produce a spunbonded nonwoven fabric in which a fiber diameter of a continuous filament was 11 μm, weight per unit area was 90 g/m$^2$ and a thickness was 0.12 mm to obtain a support for a separation membrane. The results are shown in Table 3.

TABLE 3

|  | Example 9 | Example 10 | Example 11 | Example 12 |
|---|---|---|---|---|
| Resin*[1] | PET/co-PBT | PET | PET | PLA |
| Species of sheet | Spunbonded nonwoven fabric | Spunbonded nonwoven fabric | Spunbonded nonwoven fabric | Spunbonded nonwoven fabric |
| Spinning speed (m/min) | 4500 | 4000 | 4500 | 4300 |
| Number of layers | 2 | 1 | 1 | 1 |
| Bonding method | two step | one step | one step | one step |

TABLE 3-continued

| | | Example 9 | Example 10 | Example 11 | Example 12 |
|---|---|---|---|---|---|
| Thermo-compression bonding roll | Species of roll upper/lower | steel/resin | steel/steel | steel/steel | steel/steel |
| | Surface temperature upper/lower (° C.) | 160/90 | 230/230 | 230/230 | 150/150 |
| | Line pressure (kg/cm) | 170 | 70 | 60 | 60 |
| | Fiber diameter (μm) | 11 | 14 | 12 | 11 |
| | Weight per unit area (g/m$^2$) | 60 | 90 | 60 | 90 |
| Thickness (mm) | at normal load | 0.09 | 0.15 | 0.09 | 0.12 |
| | at low load | 0.10 | 0.16 | 0.10 | 0.13 |
| | at high load | 0.09 | 0.14 | 0.09 | 0.12 |
| | Change rate of thickness (mm) | 0.01 | 0.02 | 0.01 | 0.01 |
| | Density (g/cm$^3$) | 0.7 | 0.6 | 0.7 | 0.8 |
| | Packed density | 0.5 | 0.4 | 0.5 | 0.6 |
| Tensile strength (N/5 cm) | Machine direction (MD) | 280 | 521 | 290 | 243 |
| | Crosswise direction (CD) | 126 | 171 | 102 | 91 |
| | Ratio of machine direction to crosswise direction | 2.2 | 3.0 | 2.8 | 2.7 |
| Tensile elongation (%) | Machine direction (MD) | 35 | 27 | 24 | 12 |
| | Crosswise direction (CD) | 32 | 25 | 23 | 7 |
| Product of tensile strength and tensile elongation (N/5 cm) | Machine direction (MD) | 378 | 662 | 360 | 272 |
| | Crosswise direction (CD) | 166 | 214 | 125 | 97 |
| Stress of elongation of 5% (N/5 cm) | Machine direction (MD) | 170 | 270 | 151 | 220 |
| | Crosswise direction (CD) | 90 | 120 | 64 | 85 |
| | Ratio of machine direction to crosswise direction | 1.9 | 2.3 | 2.4 | 2.6 |
| | Coefficient of variance of luminance of transmitted light (%) | 3.9 | 5.0 | 4.8 | 4.6 |
| | Air permeability (cc/cm$^2$/sec) | 6.8 | 5.2 | 7.5 | 4.2 |
| | Surface roughness Ra (μm) | 4 | 5 | 4 | 4 |
| | Degree of strike through of cast liquid during film formation (number of points) | 5 | 4 | 4 | 4 |
| Depression rate of separation membrane (μm) | Machine direction of nonwoven fabric | 33 | 24 | 34 | 29 |
| | Crosswise direction of nonwoven fabric | 37 | 35 | 46 | 38 |

*[1]PET: polyethylene terephthalate, co-PET: copolymerization polyethylene terephthalate Co-PBT: copolymerization polybutylene terephthalate, PLA: poly(lactic acid)

Example 13

The poly(L-lactic acid) resin (d) used in Example 12 was melted at 230° C., and the melted resin (d) was extruded from a pore at a nozzle temperature of 235° C. and spun into a continuous filament having a circular cross section at a spinning speed of 4300 m/min with an ejector, and the resulting filaments were collected as a fibrous web on a moving net conveyor. The collected fibrous web was supported between a pair of upper/lower steel flat rolls and preliminarily thermocompression bonded at a line pressure of 30 kg/cm by the flat rolls whose surface temperatures were 110° C. to produce a spunbonded nonwoven fabric in which a fiber diameter of a continuous filament was 11 μm, weight per unit area was 40 g/m$^2$ and a thickness was 0.16 mm.

Two sheets of the obtained spunbonded nonwoven fabrics were superimposed on each other, and the superimposed spunbonded nonwovens were supported between a pair of flat rolls in which an upper flat roll was made of steel and a lower flat roll was made of resin, and after only the upper flat roll was heated to 150° C. and a surface temperature of the resin flat roll was stabilized at 60° C., the superimposed spunbonded nonwovens were further thermocompression bonded at a line pressure of 150 kg/cm to produce a spunbonded nonwoven fabric in which weight per unit area was 80 g/m$^2$ and a thickness was 0.11 mm to obtain a support for a separation membrane. The results are shown in Table 4.

Example 14

The polyethylene terephthalate resin (a) and the copolymerization polyester resin (b), which were used in Example 1, were melted at 295° C. and 280° C., respectively. These polyethylene terephthalate resin (a) and copolymerization polyester resin (b) were extruded from a pore as a core component and a sheath component, respectively, at a nozzle temperature of 300° C. in proportions of the core and the sheath of 80:20 by weight, and these components were spun into concentric filaments of a core-sheath type having a circular cross section at a spinning speed of 4500 m/min with an ejector, and the resulting filaments were collected as a fibrous web on a moving net conveyor. The collected fibrous web was supported between a pair of upper/lower steel flat rolls and preliminarily thermocompression bonded at a line pressure of 40 kg/cm by the flat rolls whose surface temperatures were 140° C. to produce a spunbonded non-woven fabric in which a fiber diameter of a continuous filament was 11 μm, weight per unit area was 20 g/m² and a thickness was 0.10 mm.

Five sheets of the obtained spunbonded nonwoven fabrics were superimposed on one another, and the superimposed spunbonded nonwovens were supported between a pair of flat rolls in which an upper flat roll was made of steel and a lower flat roll was made of resin, and after the upper steel flat roll was heated so that its surface temperature was 170° C. and a surface temperature of the resin flat roll was stabilized at 50° C., the superimposed spunbonded nonwovens were further thermocompression bonded at a line pressure of 180 kg/cm to produce a spunbonded nonwoven fabric in which weight per unit area was 100 g/m² and a thickness was 0.13 mm to obtain a support for a separation membrane. The results are shown in Table 4.

Example 15

The polyethylene terephthalate resin (a) and the copolymerization polyester resin (b), which were used in Example 1, were melted at 295° C. and 280° C., respectively. These polyethylene terephthalate resin (a) and copolymerization polyester resin (b) were extruded from a pore as a core component and a sheath component, respectively, at a nozzle temperature of 300° C. in proportions of the core and the sheath of 80:20 by weight, and these components were spun into concentric filaments of a core-sheath type having a circular cross section at a spinning speed of 4500 m/min with an ejector, and the resulting filaments were collected as a fibrous web A on a moving net conveyor. The collected fibrous web A was carried with a net conveyor, and spinning was carried out in the same procedure as in the fibrous web A and filaments were collected as a fibrous web B on a moving fibrous web A. The collected fibrous web consisting of two layers A and B was supported between a pair of upper/lower steel flat rolls and thermocompression bonded at a line pressure of 60 kg/cm by the flat rolls whose surface temperatures were 190° C. to produce a spunbonded nonwoven fabric in which a fiber diameter of a continuous filament was 11 μm, weight per unit area was 80 g/m² and a thickness was 0.11 mm to obtain a support for a separation membrane. The results are shown in Table 4.

Comparative Example 1

A stretched polyethylene terephthalate short fiber having a fiber diameter of 10 μm and a length of 10 mm, a stretched polyethylene terephthalate short fiber having a fiber diameter of 13 μm and a length of 10 mm and a nonstretched polyethylene terephthalate short fiber having a fiber diameter of 11 μm and a length of 5 mm were mixed in water in proportions of 20:40:40 by weight, and then adequately dispersed to prepare aqueous slurry having a fiber concentration of 0.05%. The slurry was sent to a circular net paper machine, paper made and dried by a Yankee drier of 120° C. and taken up to produce a paper made web. The obtained paper made web was supported between a pair of flat rolls in which an upper flat roll was made of steel and a lower flat roll was made of an cotton, and after only the upper flat roll was heated so that its surface temperature was 150° C. and a cotton flat roll was stabilized at 80° C., the spunbonded nonwovens was further thermocompression bonded at a line pressure of 150 kg/cm to produce a paper made nonwoven fabric in which weight per unit area was 80 g/m² and a thickness was 0.11 mm to obtain a support for a separation membrane. The results are shown in Table 4.

TABLE 4

| | | Example 13 | Example 14 | Example 15 | Comparative Example 1 |
|---|---|---|---|---|---|
| | Resin*¹ | PLA | PET/co-PET | PET/co-PET | PET |
| | Species of sheet | Spunbonded nonwoven fabric | Spunbonded nonwoven fabric | Spunbonded nonwoven fabric | Paper made nonwoven fabric |
| | Spinning speed (m/min) | 4300 | 4500 | 4300 | — |
| | Number of layers | 2 | 5 | 2 | 1 |
| | Bonding method | two step | two step | one step | one step |
| Thermo-compression bonding roll | Species of roll upper/lower | steel/resin | steel/resin | steel/steel | steel/cotton |
| | Surface temperature upper/lower (° C.) | 150/60 | 170/50 | 190/190 | 150/80 |
| | Line pressure (kg/cm) | 150 | 180 | 60 | 150 |
| | Fiber diameter (μm) | 11 | 11 | 11 | 10/13 |
| | Weight per unit area (g/m²) | 80 | 100 | 80 | 80 |
| Thickness (mm) | at normal load | 0.11 | 0.13 | 0.11 | 0.11 |
| | at low load | 0.12 | 0.14 | 0.12 | 0.12 |
| | at high load | 0.11 | 0.13 | 0.11 | 0.11 |
| | Change rate of thickness (mm) | 0.01 | 0.01 | 0.01 | 0.01 |
| | Density (g/cm³) | 0.7 | 0.8 | 0.7 | 0.7 |
| | Packed density | 0.6 | 0.6 | 0.5 | 0.5 |
| Tensile strength (N/5 cm) | Machine direction (MD) | 215 | 598 | 421 | 393 |
| | Crosswise direction (CD) | 88 | 242 | 169 | 69 |
| | Ratio of machine direction to crosswise direction | 2.4 | 2.5 | 2.5 | 5.7 |

TABLE 4-continued

|  |  | Example 13 | Example 14 | Example 15 | Comparative Example 1 |
|---|---|---|---|---|---|
| Tensile elongation (%) | Machine direction (MD) | 14 | 39 | 25 | 15 |
|  | Crosswise direction (CD) | 10 | 35 | 17 | 16 |
| Product of tensile strength and tensile elongation (N/5 cm) | Machine direction (MD) | 245 | 831 | 526 | 452 |
|  | Crosswise direction (CD) | 97 | 327 | 198 | 80 |
| Stress of elongation of 5% (N/5 cm) | Machine direction (MD) | 200 | 261 | 271 | 180 |
|  | Crosswise direction (CD) | 70 | 142 | 130 | 40 |
|  | Ratio of machine direction to crosswise direction | 2.9 | 1.8 | 2.1 | 4.5 |
| Coefficient of variance of luminance of transmitted light (%) |  | 3.8 | 2.2 | 4.4 | 3.8 |
| Air permeability (cc/cm$^2$/sec) |  | 4.4 | 1.1 | 1.9 | 1.2 |
| Surface roughness Ra (μm) |  | 4 | 3 | 4 | 4 |
| Degree of strike through of cast liquid during film formation (number of points) |  | 5 | 5 | 4 | 4 |
| Depression rate of separation membrane (μm) | Machine direction of nonwoven fabric | 30 | 24 | 24 | 32 |
|  | Crosswise direction of nonwoven fabric | 42 | 33 | 34 | 53 |

*[1]PET: polyethylene terephthalatec, co-PET: copolymerization polyethylene terephthalate PLA: poly(lactic acid)

Characteristics of the support for a separation membrane obtained are shown in Tables 1 to 4.

Each of the supports for a separation membrane obtained in Examples 1 to 15 was fixed to the surface of a glass plate, and thereon, 15% by weight dimethylformamide solution (cast liquid) of polysulfone ("Udel"(registered trade mark)-P3500 manufactured by SOLVAY Advanced Polymers Co., Ltd.) was casted in a thickness of 50 μm at room temperature (20° C.), and immediately the glass plate was dipped into pure water at room temperature (20° C.) and left standing for 5 minutes to form a separation membrane made of polysulfone.

In the separation membranes using the supports for a separation membrane in Examples 1 to 15, a degree of strike through of a cast liquid during film formation was score 4 or more. Further, peeling, a nonuniform membrane and a pinhole defect are not present in any membrane and film-forming properties were good. Further, all the separation membranes using the supports for a separation membrane in Examples 1 to 15 were superior in durability since all depression rate of a separation membrane was 50 μm or less.

On the other hand, a separation membrane made of polysulfone was also formed for the support for a separation membrane obtained in Comparative Example 1 as with the supports for a separation membrane obtained in Examples 1 to 15. In the separation membrane using the support for a separation membrane in Comparative Example 1, a degree of strike through of a cast liquid during film formation was score 4 or more, but there were membrane defects that fibers of the support for a separation membrane protrude beyond the separation membrane surface. Further, the support for a separation membrane in Comparative Example 1 was inferior in durability since the depression rate of a separation membrane in a lateral direction of the nonwoven fabric was as large as 53 μm.

The invention claimed is:

1. A support for a separation membrane comprising a long-fiber nonwoven fabric which is a laminated long-fiber nonwoven fabric comprising 2 to 5 sheets of non-woven fabrics made of long fibers and composed of thermoplastic continuous filaments comprising a complex filament made of polymers having different melting points, wherein a low melting point polymer having a melting point lower by at least 10° C. than that of a high melting point polymer is arranged about the high melting point polymer, the melting point of the low melting polymer is 230 to 310° C., the melting point of the high melting polymer is 240 to 320° C., an average fiber diameter of the thermoplastic continuous filaments is 3 to 17 μm, a product of tensile strength and tensile elongation in a machine direction and crosswise direction calculated by an equation: Product of tensile strength and tensile elongation [N/5 cm]=tensile strength[N/5 cm]×(1÷tensile elongation [%]/100), is 120 to 900 N/5 cm, respectively, and the long-fiber nonwoven fabric substantially comprises only spunbonded nonwoven fabric(s).

2. The support according to claim 1, wherein tensile strength in a crosswise direction of the long-fiber nonwoven fabric is 50 N/5 cm or more and a ratio of tensile strength in the machine direction to tensile strength in the crosswise direction is 2.7 or less.

3. The support according to claim 1, wherein tensile strength of the long-fiber nonwoven fabric is 80 to 900 N/5 cm and tensile elongation of the long-fiber nonwoven fabric is 15 to 50%.

4. The support according to claim 1, wherein both stresses of elongation of 5% in the machine direction and the crosswise direction of the long-fiber nonwoven fabric are 50 N/5 cm or more.

5. The support according to claim 1, wherein a ratio of stress of elongation of 5% in the lengthwise direction to stress of elongation of 5% in the crosswise direction of the long-fiber nonwoven fabric is 2.7 or less.

6. The support according to claim 1, wherein a coefficient of variance of luminance of transmitted light of the long-fiber nonwoven fabric is 1.0 to 6.0%.

7. The support according to claim 1, wherein a packed density of the long-fiber nonwoven fabric is 0.4 to 0.8, an air permeability is 0.2 to 30.0 $cc/cm^2/sec$, and a change rate between a thickness at a low load (an indenter of 16 mm in diameter, load 2 kPa) and a thickness at a high load (an indenter of 16 mm in diameter, load 200 kPa) is 0.00 to 0.03 mm.

8. The support according to claim 1, wherein average surface roughness of the long-fiber nonwoven fabric is 2 to 9 μm.

9. A separation membrane produced by forming a membrane having a separation function on a surface of the support according to claim 1.

10. A fluid separation element including the separation membrane according to claim 9 as a constituent.

* * * * *